United States Patent
Loberg et al.

(10) Patent No.: US 11,979,736 B2
(45) Date of Patent: May 7, 2024

(54) VOICE COMMUNICATION SYSTEM WITHIN A MIXED-REALITY ENVIRONMENT

(71) Applicant: DIRTT ENVIRONMENTAL SOLUTIONS LTD., Calgary (CA)

(72) Inventors: Barrie A. Loberg, Millarville (CA); Robert Blodgett, Salt Lake City, UT (US)

(73) Assignees: DIRTT ENVIRONMENTAL SOLUTIONS LTD., Calgary (CA); ARMSTRONG WORLD INDUSTRIES, INC., Lancaster, PA (US)

( * ) Notice: Subject to any disclaimer, the term of this patent is extended or adjusted under 35 U.S.C. 154(b) by 292 days.

(21) Appl. No.: 17/602,519

(22) PCT Filed: Jun. 18, 2020

(86) PCT No.: PCT/US2020/038433
§ 371 (c)(1),
(2) Date: Oct. 8, 2021

(87) PCT Pub. No.: WO2020/257453
PCT Pub. Date: Dec. 24, 2020

(65) Prior Publication Data
US 2022/0167112 A1    May 26, 2022

Related U.S. Application Data

(60) Provisional application No. 62/864,324, filed on Jun. 20, 2019.

(51) Int. Cl.
*H04S 7/00*    (2006.01)
*G06F 3/16*    (2006.01)
(Continued)

(52) U.S. Cl.
CPC ........... *H04S 7/303* (2013.01); *G06F 3/165* (2013.01); *G10L 25/51* (2013.01); *H04R 1/08* (2013.01)

(58) Field of Classification Search
CPC ......... H04S 7/303; G06F 3/165; G10L 25/51; H04R 1/08
(Continued)

(56) References Cited

U.S. PATENT DOCUMENTS 6,057,856 A    5/2000  Miyashita et al.
9,990,689 B2   6/2018  Lashkari et al.
(Continued)

FOREIGN PATENT DOCUMENTS

CN    07851444          9/2018
WO    WO/2018/032457    2/2018
WO    WO/2018/041780    3/2018

OTHER PUBLICATIONS

International Search Report and Written Opinion for PCT/US2020/038433 dated Oct. 5, 2020.
(Continued)

*Primary Examiner* — Thjuan K Addy
(74) *Attorney, Agent, or Firm* — Workman Nydegger

(57) ABSTRACT

A computer system for facilitating voice communication within a mixed-reality environment identifies a first location of a first user within a mixed-reality environment. The first user is associated with a first electronic communication device, which is capable of facilitating voice communication between one or more users within the mixed-reality environment. The computer system identifies a second location of a second user within the mixed-reality environment. The second user is associated with a second electronic communication device, which is capable of facilitating voice communication between one or more users within the mixed-
(Continued)

reality environment. The computer system determines a vocal distance attribute between the first user and the second user and determines, based upon the vocal distance attribute, a communication state for the first electronic communication device and the second electronic communication device.

20 Claims, 7 Drawing Sheets

(51) Int. Cl.
  *G10L 25/51* (2013.01)
  *H04R 1/08* (2006.01)
(58) Field of Classification Search
  USPC .............................. 381/56, 57, 58, 77, 73.1
  See application file for complete search history.

(56) References Cited

U.S. PATENT DOCUMENTS

| | | | |
|---|---|---|---|
| 10,007,350 | B1 | 6/2018 | Holz et al. |
| 10,062,208 | B2 | 8/2018 | Ziman |
| 10,146,262 | B1 | 12/2018 | Magrath et al. |
| 10,207,187 | B2 | 2/2019 | Zoloto et al. |
| 10,300,389 | B2 | 5/2019 | Ackley et al. |
| 10,318,007 | B2 | 6/2019 | Lee et al. |
| 10,403,050 | B1 | 9/2019 | Beall et al. |
| 10,721,280 | B1 * | 7/2020 | Heppner ............... H04L 65/403 |
| 2009/0303984 | A1 | 12/2009 | Clark et al. |
| 2011/0004481 | A1 | 1/2011 | Jones |
| 2015/0193979 | A1 | 7/2015 | Grek |
| 2015/0241959 | A1 | 8/2015 | Abovitz et al. |
| 2015/0279079 | A1 | 10/2015 | Wieczorek |
| 2015/0348330 | A1 | 12/2015 | Balachandreswaran et al. |
| 2016/0070356 | A1 | 3/2016 | Aguirre et al. |
| 2016/0180574 | A1 | 6/2016 | Kaminitz et al. |
| 2016/0180595 | A1 | 6/2016 | Grossinger et al. |
| 2017/0269685 | A1 | 9/2017 | Marks et al. |
| 2017/0326457 | A1 | 11/2017 | Tilton et al. |
| 2018/0316939 | A1 | 11/2018 | Todd |
| 2019/0004618 | A1 * | 1/2019 | Tadros ................... G06F 3/012 |
| 2019/0107990 | A1 | 4/2019 | Spivack et al. |
| 2019/0139313 | A1 | 5/2019 | De La Riviere et al. |

OTHER PUBLICATIONS

"Unity VR & AR Corner" (Unknown Publication Date), Unity, <https://unity.com/VR-and-AR-corner> Retrieved through the Internet Archive Wayback Machine <https://web.archive.org/web/20200217155237/https://unity.com/VR-and-AR-corner> Feb. 17, 2020>.
Anisha Sankar (2019). Design Architecture in Virtual Reality. UWSpace. http://hdl.handle.net/10012/14751.
Arlati, S.; Colombo, V.; Spoladore, D.; Greci, L.; Pedroli, E.; Serino, S.; Cipresso, P.; Goulene, K.; Stramba-Badiale, M.; Riva, G.; Gaggioli, A.; Ferrigno, G.; Sacco, M. A Social Virtual Reality-Based Application for the Physical and Cognitive Training of the Elderly at Home. Sensors 2019, 19, 261. https://doi.org/10.3390/s19020261.
Augmented Reality. (n.d.). Apple Developer. Retrieved Mar. 28, 2022, from https://developer.apple.com/augmented reality/.
H. Kato and M. Billinghurst, "Marker tracking and HMD calibration for a video-based augmented reality conferencing system," Proceedings 2nd IEEE and ACM International Workshop on Augmented Reality (IWAR'99), 1999, pp. 85-94, doi: 10.1109/IWAR.1999.803809.
International Preliminary Report on Patentability received for PCT Patent Application No. PCT/US2020/038433, dated Dec. 30, 2021, 10 pages.
J. Thomas, R. Bashyal, S. Goldstein and E. Suma, "MuVR: a Multi-User Virtual Reality platform," 2014 IEEE Virtual Reality (VR), 2014, pp. 115-116, doi: 10.1109/VR.2014.6802078.
Melnick, K. (May 29, 2018). Antilatency Brings 6DoF VR to the Oculus Go. VRScout. Retrieved Mar. 28, 2022, https://vrscout.com/news/antilatency-6dof-on-oculus-go/#.
Steve Benford, John Bowers, Lennart E. Fahlen, Chris Greenhalgh, and Dave Snowdon. 1995. User embodiment in collaborative virtual environments. In Proceedings of the SIGCHI Conference on Human Factors in Computing Systems (CHI '95). ACM Press/Addison-Wesley Publishing Co., USA, 242-249. DOI:https://doi.org/10.1145/223904.223935.
Technologies, U. (Publication Date Unknown) Vivox. Unity. Retrieved Mar. 28, 2022, https://unity.com/products/vivox.

* cited by examiner

VOICE COMMUNICATION SYSTEM WITHIN A MIXED-REALITY ENVIRONMENT

CROSS-REFERENCE TO RELATED APPLICATIONS

The present application is a US 371 Nationalization of International Application No. PCT/US2020/038433, filed Jun. 18, 2020, which claims the benefit of and priority to U.S. Provisional Application No. 62/864,324, filed Jun. 20, 2019. The entire content of each of the aforementioned patent applications is incorporated herein by reference.

BACKGROUND

As computerized systems have increased in popularity, so have the range of applications that incorporate computational technology. Computational technology now extends across a broad range of applications, including a wide range of productivity and entertainment software. Indeed, computational technology and related software can now be found in a wide range of generic applications that are suited for many environments, as well as fairly industry-specific software.

One such industry that has employed specific types of software and other computational technology increasingly over the past few years is that related to building and/or architectural design. In particular, architects and interior designers ("or designers") use a wide range of computer-aided design (CAD) software or building information (BIM) software (i.e., "architectural design software applications") for designing the aesthetic as well as functional aspects of a given residential or commercial space. For example, a designer might use a CAD or BIM program to design a building or part of a building, and then utilize drawings or other information from that program to order or manufacture building components.

One particular benefit that is offered by modern CAD and BIM software is the ability to see a three-dimensional rendering of an architectural design. This can provide tremendous value to designers and/or clients who wish to visualize a design before starting the actual building process. For example, in at least one conventional system, a user may be able to view on a computer screen a completely rendered office building. The user may be able to navigate within the three-dimensional renderings such that the user can view different perspectives and locations throughout the design.

In some instances, users (e.g., designers, clients, etc.) may be able to navigate through a three-dimensional rendering of an architectural design using a mixed-reality (MR) system. An MR system may be configured to provide virtual reality (VR) experiences and/or augmented reality (AR) experiences.

For reference, conventional VR systems create a completely immersive experience by restricting their users' views to only a virtual environment. This is often achieved through the use of a head-mounted device (HMD) that blocks any view of the real world. As a result, a user is immersed within the virtual environment. In contrast, conventional AR systems create an augmented reality experience by visually presenting virtual objects on a transmissive display (e.g., of an HMD) that allows users to see real-world objects simultaneously with virtual objects.

As used herein, VR and AR systems are described and referenced interchangeably. Unless stated otherwise, the descriptions herein apply equally to all types of MR systems, which (as detailed above) includes AR systems, VR reality systems, and/or any other similar system capable of displaying virtual objects.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Implementations of the present disclosure extend to systems, methods, and devices for facilitating voice communication within a mixed-reality environment. For example, at least one embodiment comprises a computer system for facilitating voice communication within a mixed-reality environment. At least one embodiment comprises a method for facilitating voice communication within a mixed-reality environment. At least one embodiment comprises one or more hardware storage devices storing executable instructions that are operable, when executed by one or more processors, to configure a computer system to facilitate voice communication within a mixed-reality environment.

The embodiments disclosed and claimed herein can facilitate voice communication within a mixed-reality environment in an advantageous manner. For instance, at least some embodiments of the present disclosure are configured to determine a communication state for two users within a mixed-reality environment based on the physical and/or virtual locations of the users, thereby providing a realistic mixed-reality experience and/or avoiding echoing effects that may result from transmitting voice communications that are physically hearable.

The systems, methods, and devices of the present disclosure for facilitating voice communication within a mixed-reality environment may be associated with various acts. The acts may include identifying a first location of a first user within a mixed-reality environment. The first user may be associated with a first electronic communication device, which may be capable of facilitating voice communication between one or more users within the mixed-reality environment.

The acts may also include identifying a second location of a second user within the mixed-reality environment. The second user may be associated with a second electronic communication device, which may be capable of facilitating voice communication between one or more users within the mixed-reality environment.

The acts may also include determining a vocal distance attribute between the first user and the second user. The acts may also include determining, based upon the vocal distance attribute, a communication state for the first electronic communication device and the second electronic communication device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

DETAILED DESCRIPTION

Figure 1:
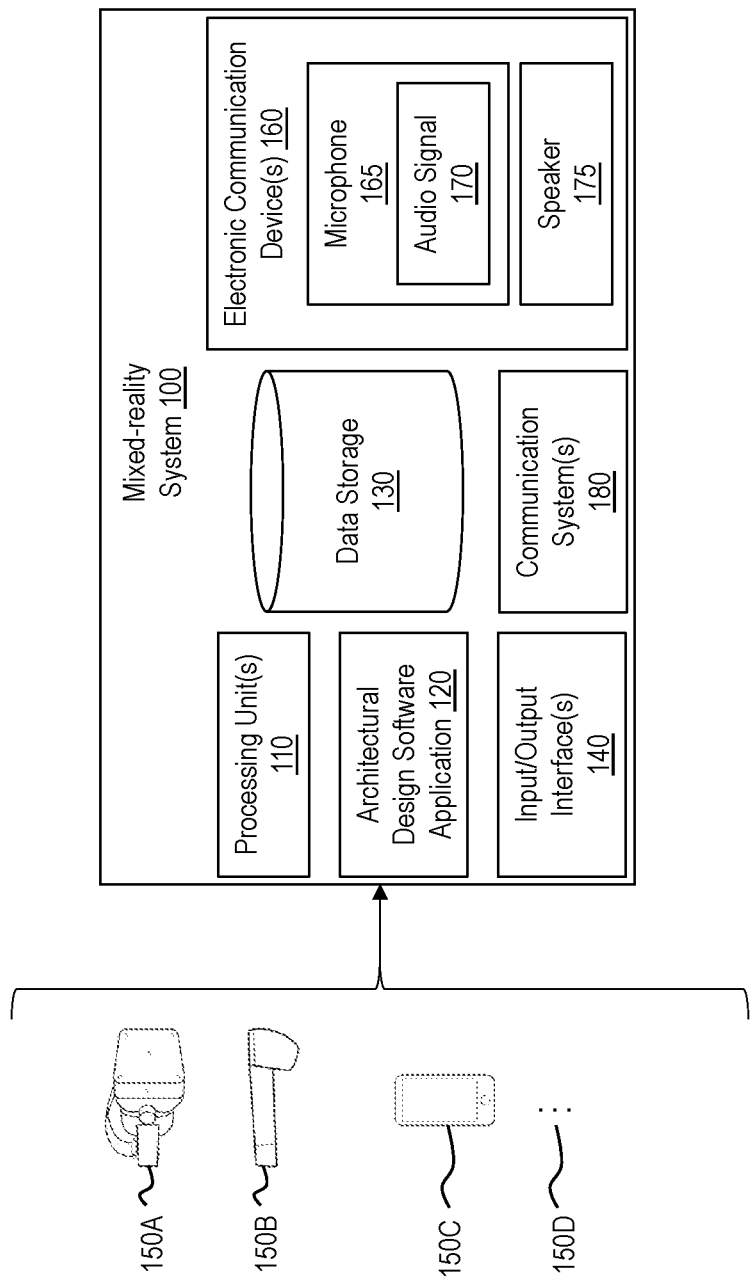
FIG. 1 illustrates an example mixed-reality system that may include or be used to implement the disclosed principles, in accordance with implementations of the present disclosure.

Implementations of the present disclosure extend to systems, methods, and devices for facilitating voice communication within a mixed-reality environment. For example, at least one embodiment comprises a computer system for facilitating voice communication within a mixed-reality environment. At least one embodiment comprises a method for facilitating voice communication within a mixed-reality environment. At least one embodiment comprises one or more hardware storage devices storing executable instructions that are operable, when executed by one or more processors, to configure a computer system to facilitate voice communication within a mixed-reality environment.

At least some disclosed embodiments include a mixed-reality architectural design system that injects mixed-reality elements into a real-world space (or a virtual representation of a real-world space). For example, a user may be interested in building out office space on an empty floor of a high-rise building. In various disclosed embodiments, the mixed-reality architectural design system injects mixed-reality elements into the floor space (or a virtual representation of the floor space) through the user's viewing device. The viewing device may comprise a mixed-reality headset, a virtual reality headset, a mobile phone display, or any other device capable of rendering three-dimensional objects and/or capturing the real-world space.

At least some disclosed embodiments allow a user to view virtual renderings of architectural designs within the real world (or a virtual representation of the real world). For instance, the mixed-reality architectural design system may be configured to display to the user mixed-reality elements that may include, for example, walls, furniture, lights, textures, and various other design elements that have been designed for the user's office. Additionally, the mixed-reality architectural design system may be configured to receive commands and present options to the user that manipulate and change the architectural design within the mixed-reality environment.

For example, while wearing a mixed-reality headset, the user may determine that a particular wall needs to be extended. Using appropriate input, which may include hand motions, eye motions, input through a keyboard, input through a touch interface, or other similar input (e.g., other gestures), the user directs the mixed-reality architectural design system to extend the wall. In at least one embodiment, the mixed-reality architectural design system extends the wall in real-time (or near real-time) such that the user sees the wall being extended within the mixed-reality environment.

Additionally, in at least one embodiment, the mixed-reality architectural design system allows for multiple people to view and/or interact with the same mixed-reality environment. For example, a designer may wish to provide a personal tour to a client of a proposed office design. The designer and the client may be able to communicate with each other vocally during the mixed-reality experience. For example, the mixed-reality devices of the users (e.g., the designer and the client) may include or be associated with electronic communication components (or devices) that facilitate electronic voice communication between the users (e.g., by transmitting detected microphone signals).

In at least one embodiment, a system for facilitating voice communication within a mixed-reality environment identifies a first location of a first user within a mixed-reality environment. The first user may be associated with a first electronic communication device, which may be capable of facilitating voice communication between one or more users within the mixed-reality environment.

Additionally, the system identifies a second location of a second user within the mixed-reality environment. The second user may be associated with a second electronic communication device, which is capable of facilitating voice communication between one or more users within the mixed-reality environment.

The system may also determine a vocal distance attribute between the first user and the second user. The system may then determine, based upon the vocal distance attribute, a communication state for the first electronic communication device and the second electronic communication device.

Those skilled in the art will recognize, in view of the present disclosure, that the implementations described herein may address at least some of the challenges associated with providing voice communications within a mixed-reality (MR) environment. For example, by determining a communication state for a computer system based on a determined vocal distance attribute between two or more users, the computer system may intelligently activate communication states that are tailored to different situations.

For instance, where the computer system determines a vocal distance attribute that indicates that users are within physical hearing distance to one another, the computer system may activate a communication state that refrains from transmitting voice communications between the users. For example, where two clients are participating in a shared MR experience and are physically located in the same physical room, a computer system may refrain from transmitting voice communications between the two clients, thereby avoiding echoing and/or other undesirable effects (e.g., wasted bandwidth) that may result from transmitting voice communications that can already be physically heard by the users.

Similarly, where the computer system determines a vocal distance attribute that indicates that users are not within physical hearing distance to one another, the computer system may activate a communication state that transmits voice communications between the users. For example, where two clients are participating in a shared MR experience and are physically located in different physical rooms, a computer system may transmit voice communications between the two clients, thereby enabling the clients to communicate with one another even while observing different portions of the MR environment.

In some instances, where the computer system determines a vocal distance attribute that indicates that users are not within virtual hearing distance to one another, the computer system may activate a communication state that refrains from transmitting voice communications between the users. For example, where a remote designer is sharing an MR experience with a client, the computer system may identify virtual objects in the MR environment that have acoustic attributes that would prevent the client from hearing the designer's voice under real-world conditions (e.g., if MR environment and the virtual objects were real), and the computer system may select a communication state that refrains from transmitting voice communications between the client and the designer.

Accordingly, at least some implementations of the present disclosure may facilitate MR experiences that intelligently determine communication states between users within an MR environment based on physical hearing distances between the users and/or virtual hearing distances between the users, thereby providing realistic voice communication within the MR environment and/or avoiding undesired voice communication within the MR environment.

FIG. 1 illustrates a schematic diagram of an embodiment of a mixed-reality system 100 (also referred to herein as a mixed-reality architectural design system). The depicted mixed-reality system 100 comprises various modules and components including one or more processing units 110, data storage 130, input/output interface(s) 140, and communication system(s) 180. One will understand, however, that the depicted modules and components are merely exemplary and are provided for the sake of explanation. In various additional or alternative embodiments, an MR system 100 may comprise different configurations and descriptions of modules and components that are equivalent to those described herein.

Furthermore, one will appreciate that the components depicted in FIG. 1 are non-limiting, and that an MR system 100 may include fewer components than those depicted or any number of additional components. For example, an MR system 100 may include one or more sensors (e.g., pose detection camera(s), depth camera(s)), pass-through camera(s), accelerometer(s), gyroscope(s), magnetometer(s)), etc.), a display engine (e.g., including laser diodes, microelectromechanical systems, display optics), and/or other components.

FIG. 1 illustrates that an MR system 100 can be implemented in various forms, such as a VR device 150A, an AR device 150B, and/or a smart phone 150C. Ellipsis 150D indicates that an MR system 100 can implemented as any type or number of devices that are configured to display virtual content, without limitation.

As depicted, the MR system 100 can include (or be in communication with) an architectural design software application 120. The architectural design software application 120 allows the MR system 100 to render and/or display virtual elements, such as virtual objects within a VR environment and/or virtual objects within an AR environment. For example, the user can design an architectural model or schematic using conventional CAD systems and then employ an architectural design software application 120 to present the architectural model as part of a mixed-reality environment.

Although the present description focuses, in some respects, on mixed-reality environments, applications, components, and/or systems that are configured for presenting architectural design models and/or objects, those skilled in the art will recognize, in view of the present disclosure, that the concepts disclosed herein are applicable to other mixed-reality systems, applications, components, and/or environments that may include any type of three-dimensional virtual models and/or objects. For example, the principles disclosed herein can be applicable to any system and/or implementation in which multiple users collaborate and/or share voice communications within a mixed-reality environment (e.g., in gaming or development experiences).

In some instances, a user can create an architectural design within a two-dimensional CAD interface. The two-dimensional design can be transformed into a three-dimensional model that can be incorporated into a mixed-reality environment. Additionally, a user can also create an architectural design within the mixed-reality environment by placing virtual architectural elements within the mixed-reality environment in real-time. For example, the user can cause a wall to be generated within the mixed-reality environment. An associated CAD file can then be updated to reflect the new wall. Accordingly, an entire architectural design can be created entirely within a mixed-reality environment.

In at least one embodiment, a processing unit 110 of an MR system manages communication and interfacing between an input/output interface 140 and architectural design software application 120. The architectural design software application 120 may comprise a special-purpose CAD program or a conventional CAD program that is capable of exporting architectural design schematics. In various embodiments, the architectural design software application 120 accesses architectural designs files that are stored within a data storage 130 (or that are at least partially stored in a remote repository). As such, the architectural design software application 120 can load a conventional architectural design file that is within data storage 130 and provide the file to processing unit 110.

The processing unit 110 may then load the three-dimensional architectural model into memory for display to one or more users (e.g., for display within a VR environment and/or within an AR environment). In some instances, the processing unit 110 generates a coordinate system that associates a virtual coordinate system within the architectural design schematic with a physical coordinate system with a real-world environment, or a representation of a real-world environment (e.g., using one or more depth maps, surface reconstruction meshes, and/or other 3D representations of the real-world environment, etc.). The processing unit 110 may then generate and/or identify rendering information for rendering the three-dimensional architectural model.

For example, the processing unit 110 may generate a coordinate system that associates the architectural schematic for a user's planned office space with a physical coordinates system that is associated with the physical office space itself. The processing unit 110 may then generate rendering information for rendering the architectural schematic for the user's planned office space according to the generated coordinate system. As such, when rendering the mixed-reality elements that are associated with the architectural design schematic, the elements may appear aligned with the real-world environment due to the common coordinate system generated by the processing unit 110.

In some instances, at least some of the processing described hereinabove with reference to processing unit 110 is performed at least partially by one or more remote systems that transmit rendering information to the MR system 100. For instance, in some implementations, the architectural design software application 120 can be implemented on a server and/or cloud platform that is/are in communication with the MR system 100.

The rendering information can comprise the three-dimensional model data describing at least a portion of the three-dimensional architectural model and coordinate information that maps the virtual coordinate system to the physical coordinate system. In at least one embodiment, the three-dimensional model data consists of geometry information and texture information describing objects within the three-dimensional architectural model.

Thus, in at least one embodiment, the mixed-reality system 100 renders received geometries and textures without any metadata or knowledge about attributes associated with the architectural elements. In contrast to providing the entire data available within the CAD file, providing only geometries and textures may provide several significant technical benefits, such as requiring significantly less processing power at the MR system 100 and/or requiring less bandwidth to communicate the information.

FIG. 1 also illustrates that an MR system 100 may be associated with an electronic communication device 160. For example, an MR system 100 may include an electronic communication device 160 implemented into the hardware of the MR system 100. In other instances, the MR system 100 is in wired or wireless communication with an electronic communication device 160 (e.g., a Bluetooth earpiece, headphone system, etc.).

FIG. 1 illustrates that an electronic communication device 160 may include a microphone 165 and a speaker 175. The microphone 165 may be configured to detect sound and provide audio signals 170 based on the detected sound (e.g., electrical signals representing the detected sounds). The speaker 175 may be configured to output sound based on a received electrical signal (e.g., a received audio signal).

Furthermore, FIG. 1 illustrates that an MR system 100 may include communication system(s) 180 that operate to send and/or receive data through a wireless channel. For example, an MR system 100 may send audio signals 170 provided by a microphone 165 of the MR system 100 using a communication system 180 of the MR system 100. Another MR system 100 may receive the audio signals 170 using a communication system 180 and output sound using one or more speakers 175. Accordingly, MR systems 100 may facilitate voice communication between users that are using MR systems.

Figure 2A:
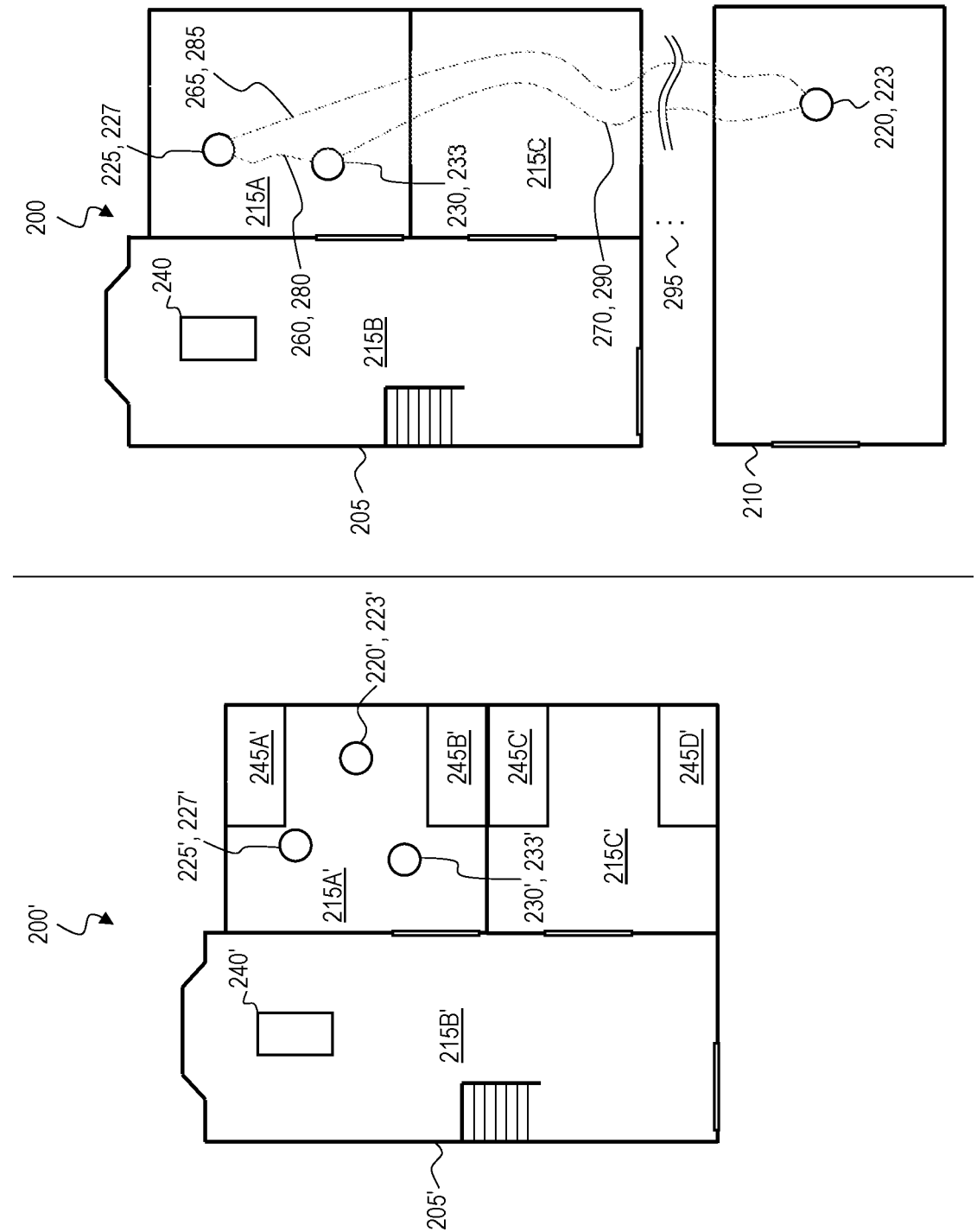
FIG. 2A illustrates example real-world and mixed-reality environments in which users may utilize mixed-reality systems to facilitate voice communication between the users, in accordance with implementations of the present disclosure.

FIG. 2A illustrates example real-world and mixed-reality environments in which users may utilize mixed-reality systems to facilitate voice communication between the users. In particular, FIG. 2A illustrates a real-world (RW) environment 200 and an MR environment 200'. The RW environment 200 of FIG. 2A includes a RW client building 205 and a RW designer building 210. The RW client building 205 and the RW designer building 210 are positioned at distinct geographic sites (e.g., as indicated in FIG. 2A by the ellipsis 295 between the RW client building 205 and the RW designer building 210). As used herein, a "geographic site" refers to a geographic location or area, such as an area on which a building, city, or other structure(s) is located.

FIG. 2A illustrates that the RW client building 205 can include various RW objects and/or spaces, such as RW rooms 215A-215C and RW table 240. FIG. 2A furthermore illustrates that one or more RW clients, such as RW client 225 and RW client 230, may be positioned within the RW client building 205. Also, FIG. 2A shows that a designer 220 may be positioned within the RW designer building 210.

Although RW clients 225 and 230 are physically remote from the RW designer 220 in the RW environment 200, RW designer 220 and RW clients 225 and 230 may jointly participate in an MR experience in an MR environment 200' (e.g., using MR systems 100, see FIG. 1). For example, RW designer 220 may have created a three-dimensional architectural design that includes modifications to the RW client building 205 (e.g., MR desks 245A'-245D'), and RW designer 220 may present the design to RW clients 225 and 230 in the form of an MR client building 205' within an MR environment 200'.

FIG. 2A illustrates that the MR environment 200' may include an MR client building 205' that includes one or more features and/or objects that correspond to RW features and/or objects of the RW client building 205. For example, FIG. 2A shows that the MR client building 205' includes MR rooms 215A'-215C' and MR table 240'. In addition, FIG. 2A illustrates that the MR client building 205' may include virtual objects and/or features, such as MR desks 245A'-245D' that do not correspond to RW features and/or objects within the RW client building 205.

In some instances, the MR environment 200' is a VR environment, in which all portions of the MR environment 200' are presented as rendered virtual objects. For example, the MR client building 205' may be a virtual representation of the RW client building 205, MR rooms 215A'-215C' may be virtual representations of RW rooms 215A-215C (respectively), and MR table 240' may be a virtual representation of RW table 240. A virtual representation of a RW object and/or space may include one or more 3D objects rendered to emulate features of the RW object and/or space.

In some instances, the MR environment 200' is an AR environment, in which some objects are presented as rendered virtual objects, whereas RW objects are presented in their RW form (e.g., where RW objects are viewable contemporaneously with virtual objects through a transmissive display of an MR system). For example, the MR client building 205' may be presented as RW client building 205, MR rooms 215A'-215C' may be presented as RW rooms 215A-215C (respectively), and MR table 240' may be presented as RW table 240 within the MR environment 200'. The MR environment 200' may present the aforementioned objects in their RW form through a transmissive display of an MR system while presenting MR desks 245A'-245D' as rendered virtual objects.

Figure 2B:
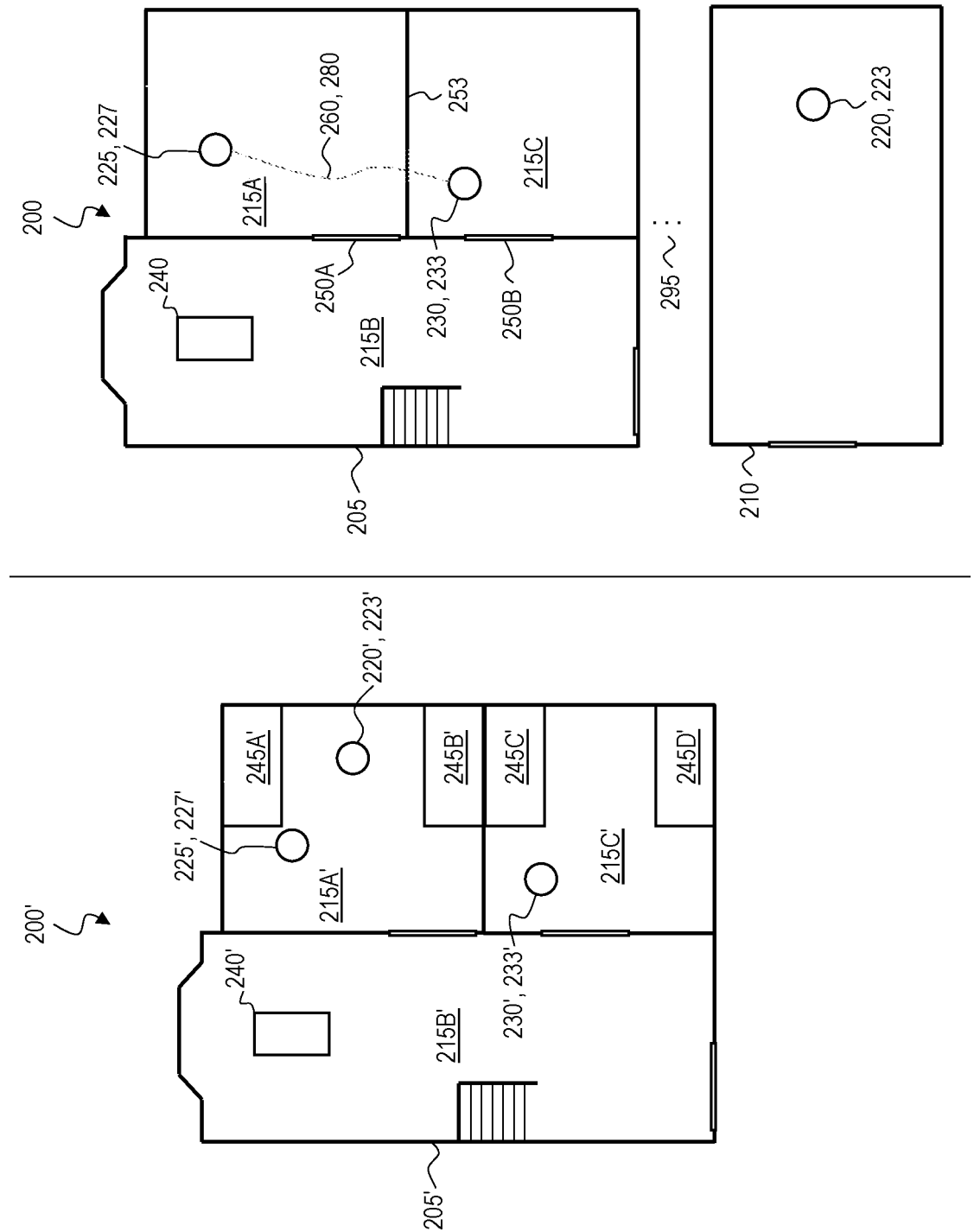
FIG. 2B illustrates the example real-world and mixed-reality environments of FIG. 2A in which one user has changed locations within the mixed-reality environment, in accordance with implementations of the present disclosure.
Figure 2C:
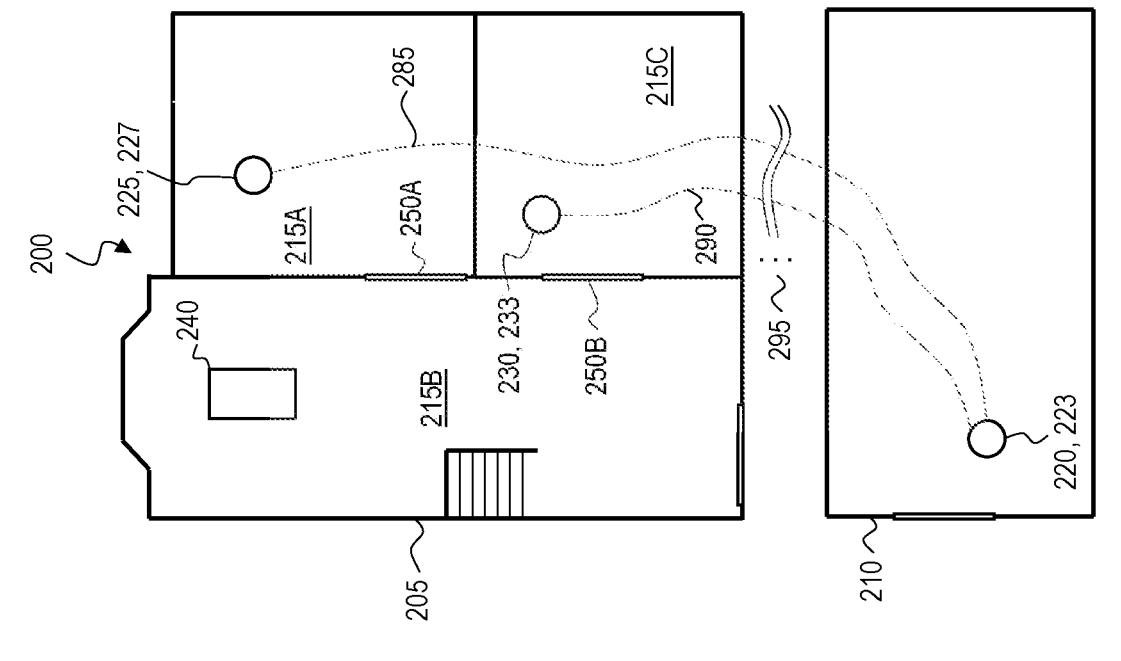
FIG. 2C illustrates the example real-world and mixed-reality environments of FIG. 2B in which another user has changed locations within the mixed-reality environment, in accordance with implementations of the present disclosure.
Figure 2C:
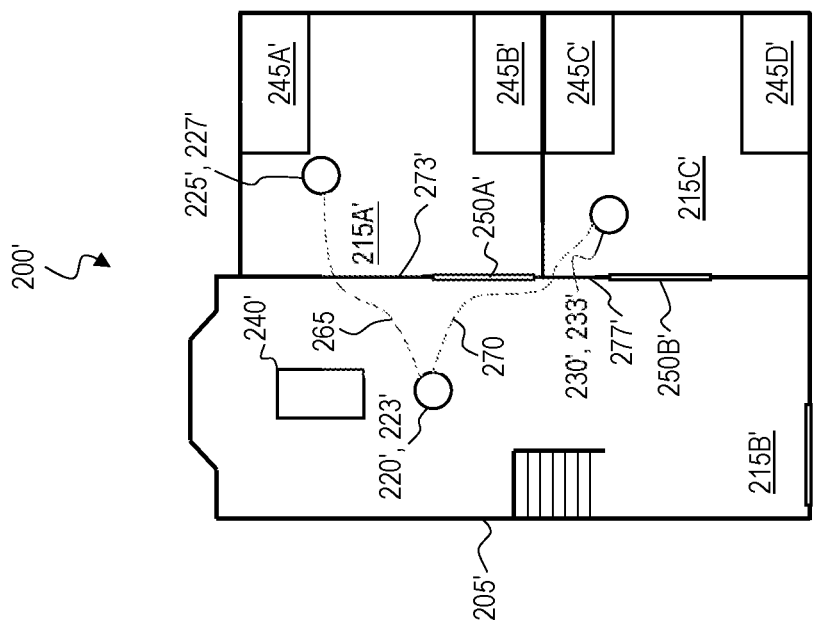

Although FIGS. 2A-2C focus, in some respects, on an MR environment 200' that at least partially corresponds to a RW space in which a user participating in the MR environment 200' is positioned (e.g., RW client building 205), those skilled in the art will recognize, in view of the present disclosure, that the MR environment 200' need not correspond to a RW space in which a user participating in the MR environment 200' is positioned. For example, the MR environment 200' may include a VR representation of a building that has not been built yet, and the building may be scheduled for construction at a geographic site that is distinct form the geographic sites at which any user is physically positioned while participating in the MR environment 200'. In this regard, for example, an RW client building 205 need not have anything in common with an MR client building 205'.

FIG. 2A furthermore illustrates that RW client 225 is represented in the MR environment 200' as MR client 225', RW client 230 is represented in the MR environment 200' as MR client 230', and RW designer 220 is represented in the MR environment 200' as MR designer 220'. In some instances, the MR environment 200' presents MR client 225' as a virtual representation of RW client 225, presents MR client 230' as a virtual representation of RW client 230, and/or presents MR designer 220' as a virtual representation of RW designer 220. In other instances, the MR environment 200' presents MR client 225' as RW client 225 in RW form, presents MR client 230' as RW client 230 in RW form, and/or presents MR designer 220' as RW designer 220 in RW form.

In one illustrative example, the MR client building 205' of the MR environment 200' of FIG. 2A corresponds to the RW client building 205 of the RW environment 200. Thus, in some instances, RW clients 225 and 230 may experience the MR environment 200' as an AR environment, while RW designer 220 may experience the MR environment 200' as a VR environment. In such instances, RW client 225 may perceive MR client 230' as RW client 230 in RW form (e.g., through transmissive displays of MR systems 100). Similarly, RW client 230 may perceive MR client 225' as RW client 225 in RW form.

Furthermore, because RW designer 220 may experience the MR environment 200' as a VR environment, RW designer may perceive both MR client 225' and MR client 230' as virtual representations of RW client 225 and RW client 230, respectively. Similarly, RW clients 225 and 230 may perceive MR designer 220' as a virtual representation of RW designer 220.

FIG. 2A illustrates RW client 225 at physical location 227 and illustrates RW client 230 at physical location 233 within the RW environment 200. FIG. 2A also illustrates RW designer 220 at physical location 223 within RW designer building 210 within the RW environment. Furthermore, FIG. 2A illustrates MR clients 225' and 230' at virtual locations 227' and 233', respectively, and illustrates MR designer 220' at virtual location 223'.

FIG. 2A depicts physical locations 227 and 233 (for RW clients 225 and 230, respectively) at positions within RW room 215A of the RW client building 205 of the RW environment 200. FIG. 2A also shows virtual locations 227' and 233' (for MR clients 225' and 230', respectively) at corresponding positions within MR room 215A' of the MR client building 205' of the MR environment 200'. Thus, FIG. 2A illustrates that, in some instances, a user's virtual location may correspond to the user's physical location, such as where the user is experiencing the MR environment 200' as an AR environment (e.g., as may be the case for RW clients 225 and 230).

It should be noted, however, that a user's virtual position may also correspond to the user's physical position where the user is experiencing the MR environment 200' as a VR environment, such as a pass-through VR environment.

In contrast, FIG. 2A depicts physical location 223 for RW designer 220 at a position within the RW designer building 210 of the RW environment 200. However, FIG. 2A shows virtual location 223' for MR designer 220' at a position within MR room 215A' of the MR client building 205' of the MR environment 200'. Thus, FIG. 2A illustrates that, in some instances, a user's virtual location does not correspond to the user's physical location, such as where the user is experiencing the MR environment 200' as a VR environment (e.g., as may be the case for RW designer 220).

Thus, as used herein, a location of a user that is participating in an MR environment 200' (e.g., RW clients 225, 230, RW designer 220) may refer to the user's physical location and/or the user's virtual location.

In some instances, a user that is using an MR system 100 to participate in an MR environment 200' may communicate with other users that are participating in the MR environment 200' through an electronic communication device 160 that is associated with the user and/or the MR system 100 (see FIG. 1). In at least some implementations of the present disclosure, an MR system 100 (and/or one or more other computing systems) may intelligently select a communication state (e.g., communication states 280, 285, and 290) for electronic communications between users participating within an MR environment 200'.

A communication state may be based on a determined vocal distance attribute (e.g., vocal distance attributes 260, 265, 270) between users participating in the MR environment. The vocal distance attribute may be based on physical locations of users, virtual locations of users, and/or other factors. As used herein, the "vocal distance attribute" comprises a metric that indicates the ability of noise to transmit/travel from one user to another user and/or from one location to another location. In some instances, a vocal distance attribute may indicate an ability of noise to transmit/travel from one user/location to another in a RW environment (e.g., RW environment 200). Additionally, or alternatively, a vocal distance attribute may indicate an ability of noise transmit/travel from one user/location to another in an MR environment (e.g., MR environment 200').

A vocal distance attribute may comprise an indication of the physical and/or virtual distance between two users/locations. In some instances, a vocal distance attribute may comprise an indication of a RW geographic disconnection between two users/locations (e.g., where two users are located at different geographic sites). In some instances, a vocal distance attribute may comprise an indication of whether two users/locations are within a same virtual or physical room. Additionally, or alternatively, the vocal distance attribute may comprise an indication of real and/or virtual objects with RW or virtual acoustic properties (e.g., insulating, reflective) that are positioned between two users/locations.

For example, RW designer 220 may be associated with a first electronic communication device 160, RW client 225 may be associated with a second electronic communication device 160, and RW client 230 may be associated with a third electronic communication device 160. Each electronic communication device 160 may be capable of facilitating voice communication between the users (e.g., RW designer 220, RW client 225, and RW client 230) as they participate in the MR environment 200'.

In some instances, a system (e.g., one or more MR systems 100 and/or other computing systems) determines a vocal distance attribute between the users that are participating in the MR environment 200'. For example, a system may identify a vocal distance attribute 260 between RW client 225 and RW client 230, a vocal distance attribute 265 between RW client 225 and RW designer 220, and/or a vocal distance attribute 270 between RW client 230 and RW designer 220.

In some implementations, determining a vocal distance attribute between two users may include determining the physical locations and/or geographic sites of the users. A system may determine physical locations and/or geographic sites of users in a variety of ways. For example, a system may utilize radio-based positioning data (e.g., GPS, CSLI, Bluetooth signal strength, and/or others), device registration data, user input, beacon-based approaches (e.g., Bluetooth beacons associated with users), pedestrian dead reckoning approaches, inertial tracking systems (e.g., accelerometer(s), gyroscope(s), magnetometer(s)), visual tracking systems (e.g., for pose detection (such as simultaneous location and mapping), object detection/recognition/segmentation), combinations thereof, and/or other location tracking systems/techniques to determine absolute and/or relative physical locations and/or geographic sites of users (e.g., relative to one another, relative to physical and/or virtual reference objects/positions, etc.).

Accordingly, a system may determine the physical location 223 of RW designer 220 and the physical locations 227 and 233 of RW clients 225 and 230, respectively. The system may also determine that the physical location 223 of RW designer 220 is at the RW designer building 210, which is a physical geographic site that is distinct from the RW client building 205 where RW clients 225, 230 are located (e.g., according to physical locations 227 and 233). Accordingly, the vocal distance attribute 265 between RW designer 220 and RW client 225 and the vocal distance attribute 270 between RW designer 220 and RW client 230 may indicate the disconnection between the physical geographic sites of the RW clients 225, 230 and RW designer 220.

In some instances, based on the vocal distance attribute indicating the disconnection between the physical geographic sites of the RW clients 225, 230 and RW designer 220, a system may determine a communication state 285 between RW client 225 and RW designer 220 that causes voice communications to be transmitted between RW client 225 and RW designer 220. Similarly, a system may determine a communication state 290 between RW client 230 and RW designer 220 that causes voice communications to be transmitted between RW client 230 and RW designer 220.

Furthermore, in some instances, although a vocal distance attribute may indicate a disconnection between physical geographic sites of users, a system may perform further analysis for determining the vocal distance attribute that may influence the communication state. For example, after determining that two users are at different geographic sites, a system may determine whether a constant communication setting is enabled, and/or whether the two users are within virtual hearing distance to one another within the MR environment 200' (see FIGS. 2C and 5).

Based on determining the physical locations 227 and 233 of RW clients 225 and 230, respectively, the system may determine a vocal distance attribute 260 between RW clients 225 and 230. For example, determining the vocal distance attribute 260 may include determining whether physical location 227 of RW client 225 is within physical hearing distance of physical location 233 of RW client 230. Those skilled in the art will recognize, in view of the present disclosure, that a system may determine whether two physical locations are within physical hearing distance to one another in response to determining that the two physical locations are within the same geographic site, or without regard to a determination of whether the two physical locations are within the same geographic site.

As used herein, physical hearing distance refers to the distance or range of distances at which a given sound can be heard within a RW environment 200, and physical hearing distance may account for RW objects and/or characteristics/configurations thereof within a RW environment 200.

A system may determine whether the physical locations 227 and 233 are within physical hearing distance to one another (pursuant to determining vocal distance attribute 260) in a variety of ways. In some instances, determining whether the physical locations 227 and 233 are within physical hearing distance to one another may include identifying whether the physical location 227 and the physical location 233 are within a same RW room. For example, a system may identify the physical locations 227 and 233 as described hereinabove and identify the positioning of the physical locations 227 and 233 relative to one another, the RW rooms 215A-215C, and/or any other RW object/feature/location or virtual representation thereof.

In another example, in some implementations, a system identifies a Bluetooth signal strength associated with the users/user locations to determine whether the users are within physical hearing distance to one another. For instance, an MR system 100 associated with RW client 225 and an MR system 100 associated with RW client 230 may be paired, via Bluetooth, to one another and/or to one or more Bluetooth beacons. A system may then analyze the Bluetooth signal strength between the MR systems 100 and/or the Bluetooth beacon(s) to determine whether the physical locations 227 and 233 of the users (RW client 225 and RW client 230) are within physical hearing distance to one another.

FIG. 2A illustrates an example scenario in which a system may determine that the physical locations 227 and 233 for RW clients 225 and 230, respectively, are within the same RW room 215A. Accordingly, in some implementations, a system may determine that the physical locations 227 and 233, as depicted in FIG. 2A, are within physical hearing distance to one another.

In some instances, determining whether the physical locations 227 and 233 are within physical hearing distance to one another may include identifying the positions and/or states of one or more RW objects, such as RW objects that are positioned between the physical locations 227 and 233 within RW environment 200 (e.g., using one or more scans of at least a portion of the RW environment 200, and/or information for virtual representation(s) of parts of the RW environment 200).

FIG. 2A illustrates an example scenario in which a system may determine that no RW physical objects are positioned directly between the physical locations 227 and 233 for RW clients 225 and 230, respectively. Accordingly, in some implementations, a system may determine that the physical locations 227 and 233, as depicted in FIG. 2A, are within physical hearing distance to one another.

In some instances, determining whether the physical locations 227 and 233 are within physical hearing distance to one another may be based on a comparison of audio signals 170 detected by microphones 165 of electronic communication devices 160 associated with RW client 225 and RW client 230.

For example, a system may identify an audio signal 170 detected by a microphone 165 of an electronic communication device 160 that is associated with RW client 225 (or another user). The audio signal 170 detected by the microphone 165 associated with RW client 225 may be representative of a verbal communication of RW client 225. The system may also identify an audio signal 170 detected by a microphone 165 of an electronic communication device 160 that is associated with RW client 230. The system may then determine whether the audio signal 170 detected by the microphone 165 associated with RW client 230 corresponds to the audio signal 170 detected by the microphone 165 associated with RW client 225.

Put differently, the system may determine whether both of the audio signals 170 detected by the different microphones 165 associated with the different RW clients 225, 230 are both representative of the same verbal communication (e.g., the verbal communication of RW client 225). In some instances, if both microphones 165 are able to detect audio signals 170 representative of the same verbal communication, the locations of the two microphones 165 (and the users associated with the two microphones 165) may be within physical hearing distance to one another.

To determine whether two audio signals 170 detected by different microphones 165 are representative of the same verbal communication, a system may perform, by way of non-limiting example, a cross-correlation between the two audio signals 170 to determine a correlation magnitude between the two audio signals 170. In some instances, if the correlation magnitude meets or exceeds a predetermined threshold value, the system may determine that the locations of the two microphones 165 are within physical hearing distance to one another.

A system may perform additional and/or alternative analysis on audio signals 170 detected by different microphones 165. For example, in some instances, after determining that two audio signals 170 detected by two different microphones 165 are representative of the same verbal communication, a system may determine a similarity of amplitudes of the two detected audio signals 170. The system may determine that the locations of the two different microphones 165 are within physical hearing distance to one another based on the similarity of the amplitudes of the two detected audio signals 170.

Those skilled in the art will recognize, in view of the present disclosure, that the processing for analyzing audio signals 170 (or any other processing or task described herein) may be performed by any number and/or combination of computing systems, such as one or more MR systems 100, servers, cloud resources, etc.

FIG. 2A illustrates an example scenario in which a system may determine that a microphone 165 associated RW client 225 at physical location 227 and a microphone 165 associated with RW client 230 at physical location 233 both detect audio signals 170 that are representative of a verbal communication from RW client 225 (or RW client 230). Accordingly, in some implementations, a system may determine that the physical locations 227 and 233, as depicted in FIG. 2A, are within physical hearing distance to one another.

One will appreciate, in view of the present disclosure, that whether two microphones 165 associated with different users may detect audio signals 170 representative of voice communications of a single user may depend on the decibel level (or other sound level metric) of the voice communications of the single user. For example, a system may determine that the physical locations 227 and 233 for RW clients 225 and 230, respectively, are within physical hearing distance to one another for utterances at or above a certain decibel level. Similarly, the system may determine that the physical locations 227 and 233 are not within physical hearing distance to one another for utterances that are at or below a certain decibel level.

In some instances, in response to determining that a vocal distance attribute indicates that two physical locations (e.g., physical locations 227 and 233 from FIG. 2A) are within physical hearing distance to one another (e.g., according to any of the techniques described herein), a system may determine a communication state for the users at the two physical locations (e.g., communication state 280 for RW clients 225 and 230) that refrains from transmitting voice communications between the users (e.g., RW clients 225 and 230), thereby avoiding echoing effects that may result from electronically transmitting and presenting voice communications that are physically hearable.

Those skilled in the art will appreciate, in view of the present disclosure, that refraining from transmitting voice communications between users may be effectuated in various ways. For example, an MR system 100 (e.g., one or more components thereof) that detects a voice communication in the form of an audio signal 170 may refrain from transmitting the audio signal to another MR system 100 for presentation at the other MR system 100. Similarly, an MR system 100 may refrain from presenting a received audio signal 170. In some instances, an intermediary component (e.g., a server and/or cloud component) may prevent an audio signal 170 transmitted by one MR system 100 from passing to another MR system 100.

FIG. 2B illustrates the example real-world environment 200 and mixed-reality environment 200' of FIG. 2A in which the physical location 233 of RW client 230 has changed within the RW environment 200. Similarly, the virtual location 233' of MR client 230' has changed within the MR environment 200'. FIG. 2B illustrates additional examples of determining a vocal distance attribute 260 between RW client 225 and RW client 230 based on the physical locations and/or geographic sites associated with RW client 225 and RW client 230.

For instance, a system may determine that the physical locations 227 and 233 of RW clients 225 and 230, respectively (as depicted in FIG. 2B), are within the same geographic site (i.e., the RW client building 205). Based on this determination, in some instances, the system may proceed to determine whether the physical locations 227 and 233 of RW clients 225 and 230, respectively (as depicted in FIG. 2B), are within physical hearing distance to one another.

FIG. 2B illustrates an example scenario in which a system may determine that the physical locations 227 and 233 for RW clients 225 and 230, respectively, are within different rooms. FIG. 2B shows that the system may determine that the physical location 227 of RW client 225 is within RW room 215A, whereas the physical location 233 of RW client 230 is within RW room 215C. Accordingly, in some implementations, a system may determine that the physical locations 227 and 233, as depicted in FIG. 2B, are not within physical hearing distance to one another.

FIG. 2B also illustrates an example scenario in which a system may determine that RW physical objects, such as RW wall 253 and/or RW door 250A are positioned between the physical locations 227 and 233 for RW clients 225 and 230, respectively. Accordingly, in some implementations, a system may determine that the physical locations 227 and 233, as depicted in FIG. 2B, are not within physical hearing distance to one another.

In some instances, the system identifies a configuration of one or more RW objects in the RW environment 200 in determining whether the physical locations 227 and 233 are within physical hearing distance to one another. For example, the system may recognize whether RW door 250A and/or RW door 250B are in an open configuration, which may influence the system's determination as to whether the physical locations 227 and 233 are within physical hearing distance to one another.

In some instances, the system identifies acoustic characteristics of one or more RW objects in the RW environment 200 in determining whether the physical locations 227 and 233 are within physical hearing distance to one another.

For example, a scan of the RW environment 200 may be segmented to identify RW objects within the RW environment 200, and acoustic information about the segmented objects may be identified in a data repository and/or through machine learning-based methods (e.g., comparing attributes of a segmented RW object to attributes of RW objects within a database of RW objects). In some instances, a system may identify a virtual representation of an RW object that includes metadata indicating an acoustic attribute for the represented RW object. The acoustic characteristics of one or more RW objects in the RW environment 200 may influence whether two RW locations (e.g., physical locations 227 and 233 for RW clients 225 and 230) are determined to be within physical hearing distance to one another.

Accordingly, FIG. 2B illustrates an example scenario in which a system may determine acoustic attributes of RW wall 253, RW door 250A, and/or RW door 250B, such as whether any of the RW objects include sound insulating or reflective attributes. Thus, the acoustic attributes of RW objects positioned between the physical locations 227 and 233 of RW clients 225 and 230 may influence the system's determination as to whether the physical locations 227 and 233 are within physical hearing distance to one another.

In some instances, whether two physical locations (e.g., physical locations 227 and 233) are within physical hearing distance to one another may depend on the decibel level (or other sound level metric) of speech uttered from at least one of the physical locations.

For example, a system may identify a decibel level associated with speech uttered by RW client 225 (or RW client 230). The system may then identify an intelligible sound distance that the speech at the detected decibel level would propagate in empty space while remaining intelligible to the human ear. Based on the intelligible sound distance, the system may expand a radius (or region of interest of any shape) out from the physical location 227 (or the physical location 233). The system may then, in some instances, identify the sound insulation attributes of RW objects that are within the intelligible sound distance from the physical location 227 (or the physical location 233). As RW objects are identified, the system may calculate the effect of the respective sound insulating attributes on the uttered speech.

For example, as depicted in FIG. 2B, a system's determinations as to whether the physical locations 227 and 233 for RW clients 225 and 230, respectively, are within physical hearing distance to one another may depend on the decibel level of vocal communications uttered by RW client 225 and/or RW client 230 (depending, in some instances, on the acoustic attributes of RW wall 253, RW door 250A, and/or RW door 250B).

FIG. 2B also illustrates an example scenario in which a system may determine that a microphone 165 associated RW client 230 at physical location 233 fails to detect audio signals 170 that are representative of a verbal communication from RW client 225. Accordingly, in some implementations, a system may determine that the physical locations 227 and 233, as depicted in FIG. 2B, are not within physical hearing distance to one another.

In some instances, in response to determining that a vocal distance attribute (e.g., vocal distance attribute 260) indicates that two physical locations (e.g., physical locations 227 and 233 from FIG. 2B) are not within physical hearing distance to one another (e.g., according to any of the techniques described herein), a system may determine a communication state for the users at the two physical locations (e.g., communication state 280 for RW clients 225 and 230) that transmits voice communications between the users (e.g., RW clients 225 and 230), thereby allowing users to communicate with one another while participating in an MR environment 200'.

It should be noted that, in some instances, although a vocal distance attribute may indicate that two users are not within physical hearing distance of one another, a system may perform further analysis for determining the vocal distance attribute that may influence the communication state. For example, after determining that two users are not within physical hearing distance to one another, a system may determine whether a constant communication setting is enabled, and/or whether the two users are within virtual hearing distance to one another within the MR environment 200' (see FIGS. 2C and 5).

FIG. 2C illustrates the example real-world environment 200 and mixed-reality environment 200' of FIG. 2B in which the virtual location 223' of MR designer 220' has changed within the MR environment 200'. Similarly, the RW location 223 of RW designer 220 has changed within the RW environment 200. FIG. 2C illustrates examples of determining vocal distance attributes 265 and 270 between MR designer 220' and the MR clients 225' and 230', respectively.

FIG. 2C illustrates that determining a vocal distance attribute between users may include determining whether virtual locations associated with the users are within virtual hearing distance to one another, based on the virtual locations of the users.

Virtual hearing distance refers to the virtual distance or range of virtual distances at which a given sound can be heard within an MR environment 200' and virtual hearing distance may account for MR objects and/or characteristics/configurations thereof within an MR environment 200'. For example, virtual hearing distance may represent a physical hearing distance that would exist for an MR environment that was implemented as an RW environment. Thus, at least some of the principles described herein with reference to physical hearing distance correspond to similar principles for virtual hearing distance.

In some instances, modifying a communication state based on whether a vocal distance attribute indicates that two users/locations are within virtual hearing distance to one another may improve the realism of an MR environment 200' by transmitting voice communications that a user would expect to be able to hear within the MR environment 200' and refraining from transmitting voice communications that a user would not expect to be able to hear within the MR environment.

Determining a vocal distance attribute between two users may include determining the virtual locations of the users. A system may determine virtual locations in a variety of ways.

For example, a system may utilize radio-based positioning data (e.g., GPS, CSLI, and/or others), device registration data, user input, beacon-based approaches, pedestrian dead reckoning approaches, inertial tracking systems (e.g., accelerometer(s), gyroscope(s), magnetometer(s)), visual tracking systems (e.g., for pose detection (such as simultaneous location and mapping), object detection/recognition/segmentation), combinations thereof, and/or other location tracking systems/techniques to determine absolute and/or relative virtual locations of users (e.g., relative to one another, relative to physical and/or virtual reference objects/positions, etc.).

Accordingly, a system may determine the virtual location 223' of MR designer 220' and the virtual locations 227' and 233' of MR clients 225' and 230', respectively.

A system may determine whether the virtual location 223' of MR designer 220' is within virtual hearing distance to the virtual locations 227' and 233' of the MR clients 225' and 230', respectively, in a variety of ways. In some instances, determining whether the virtual locations 223' is within virtual hearing distance to the virtual location 227' and/or the virtual location 233' may include identifying whether the virtual locations 223', 227', and/or 233' are within a same MR room.

For example, FIG. 2C demonstrates that a system may identify that the virtual location 223' is within MR room 215B', the virtual location 227' is within MR room 215A', and the virtual location 233' is within MR room 215C'. In some instances, based on the determination that the virtual location 223' is in a different MR room than the virtual locations 227' and 233' (as depicted in FIG. 2C), a system may determine that the virtual location 223' is not within virtual hearing distance to the virtual location 227' or the virtual location 233'.

In some instances, determining whether the virtual locations 223' is within virtual hearing distance to the virtual location 227' and/or the virtual location 233' may include identifying the positions and/or states of one or more virtual objects, such as MR objects that are positioned between the virtual locations 223', 227' and/or 233' within the MR environment 200' (e.g., using data representing the MR environment 200').

FIG. 2C also illustrates an example scenario in which a system may determine that MR physical objects, such as MR walls 273', 277', and/or MR doors 250A', 250B' are positioned between the virtual location 223' for MR designer 220' and the virtual location 227' and/or 233' for MR clients 225' and 230', respectively. Accordingly, in some implementations, a system may determine that the virtual location 223' and the virtual location 227' and/or 233', as depicted in FIG. 2C, are not within virtual hearing distance to one another.

In some instances, the system identifies a configuration of one or more MR objects in the MR environment 200' in determining whether the virtual location 223' and the virtual location 227' and/or 233' are within virtual hearing distance to one another. For example, the system may recognize whether MR door 250A' and/or MR door 250B' are in an open configuration, which may influence the system's determination as to whether the virtual location 223' and the virtual location 227' and/or 233' are within virtual hearing distance to one another.

In some instances, the system identifies acoustic characteristics of one or more MR objects in the MR environment 200' in determining whether the virtual location 223' and the virtual location 227' and/or 233' are within physical hearing distance to one another.

For example, a 3D representation (e.g., a surface mesh, point cloud, etc.) of the MR environment 200' may include metadata for one or more of the MR objects within the MR environment 200', and the metadata may include acoustic information about the MR object(s). In some instances, acoustic information for MR objects may be identified in a data repository and/or through machine learning-based methods (e.g., comparing attributes of an MR object to attributes of MR objects within a database of MR objects). The acoustic characteristics of one or more MR objects in the MR environment 200' may influence whether two MR locations (e.g., virtual location 223' and the virtual location 227' and/or 233') are determined to be within virtual hearing distance to one another.

Accordingly, FIG. 2C illustrates an example scenario in which a system may determine acoustic attributes of MR walls 273', 277', and/or MR doors 250A', 250B', such as whether any of the MR objects include sound insulating or reflective attributes. Thus, the acoustic attributes of MR objects positioned between the virtual location 223' and the virtual location 227' and/or 233' may influence the system's determination as to whether the virtual location 223' and the virtual location 227' and/or 233' are within virtual hearing distance to one another.

In some instances, whether two virtual locations (e.g., virtual location 223' and the virtual location 227' and/or 233') are within virtual hearing distance to one another may depend on the decibel level (or other sound level metric) of speech uttered from at least one of the virtual locations.

For example, a system may identify a decibel level associated with speech uttered by MR designer 220'. The system may then identify an intelligible sound distance that the speech at the detected decibel level would propagate in empty space while remaining intelligible to the human ear. Based on the intelligible sound distance, the system may expand a radius (or region of interest of any shape) out from the virtual location 223'. The system may then, in some instances, identify the sound insulation attributes of MR objects that are within the intelligible sound distance from the virtual location 223'. As MR objects are identified, the system may calculate the effect of the respective sound insulating attributes on the uttered speech.

For example, as depicted in FIG. 2C, a system's determinations as to whether the virtual location 223' and the virtual location 227' and/or 233' are within virtual hearing distance to one another may depend on the decibel level of vocal communications uttered by MR designer 220', MR client 225', and/or MR client 230' (depending, in some instances, on the acoustic attributes of MR walls 273', 277', and/or MR doors 250A', 250B').

In some instances, in response to determining that a vocal distance attribute (e.g., vocal distance attribute 265 between MR designer 220' and MR client 225', vocal distance attribute 270 between MR designer 220' and MR client 230') indicates that two virtual locations (virtual location 223' and the virtual location 227' and/or 233') are within virtual hearing distance to one another (e.g., according to any of the techniques described herein), a system may determine a communication state for the users at the two virtual locations (e.g., communication state 285 between RW designer 220 and RW client 225, communication state 290 between RW designer 220 and RW client 230) that transmits voice communications between the users (e.g., between RW designer 220 and RW client 225, between RW designer 220 and RW client 230).

In some instances, in response to determining that a vocal distance attribute (e.g., vocal distance attribute 265 between MR designer 220' and MR client 225', vocal distance attribute 270 between MR designer 220' and MR client 230') indicates that two virtual locations (virtual location 223' and the virtual location 227' and/or 233') are not within virtual hearing distance to one another (e.g., according to any of the techniques described herein), a system may determine a communication state for the users at the two virtual locations (e.g., communication state 285 between RW designer 220 and RW client 225, communication state 290 between RW designer 220 and RW client 230) that refrains from transmitting voice communications between the users (e.g., between RW designer 220 and RW client 225, between RW designer 220 and RW client 230).

Accordingly, one will appreciate, in view of the present disclosure, that at least some implementations disclosed herein may provide a realistic vocal communication experience within an MR environment 200' that may also avoid echoing effects that may result from transmitting voice communications that are physically hearable.

A vocal distance attribute may be dynamically updated in real time (or near real time) as circumstances change within an MR environment 200'. A vocal distance attribute may be represented in any suitable form, such as, for example, one or more binary, integer, float, and/or other numerical values. In some instances, communication states may be determined based on whether a vocal distance attribute meets or exceeds a predetermined threshold value, or whether a vocal distance attribute is within a predefined range of values.

Figure 3:
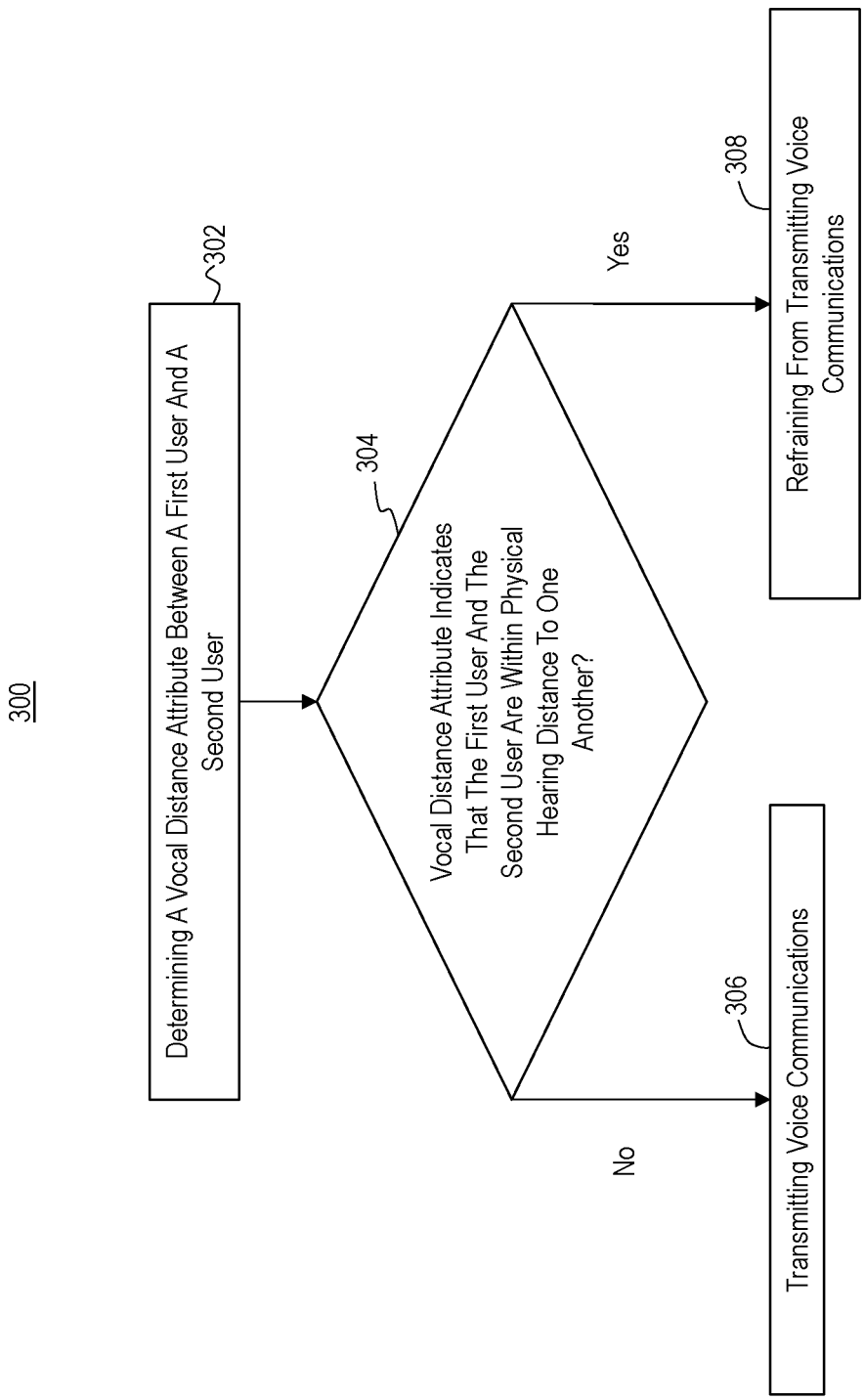
FIG. 3 illustrates an example flow diagram depicting various acts associated with determining a communication state for electronic communication devices, in accordance with implementations of the present disclosure.
Figure 4:
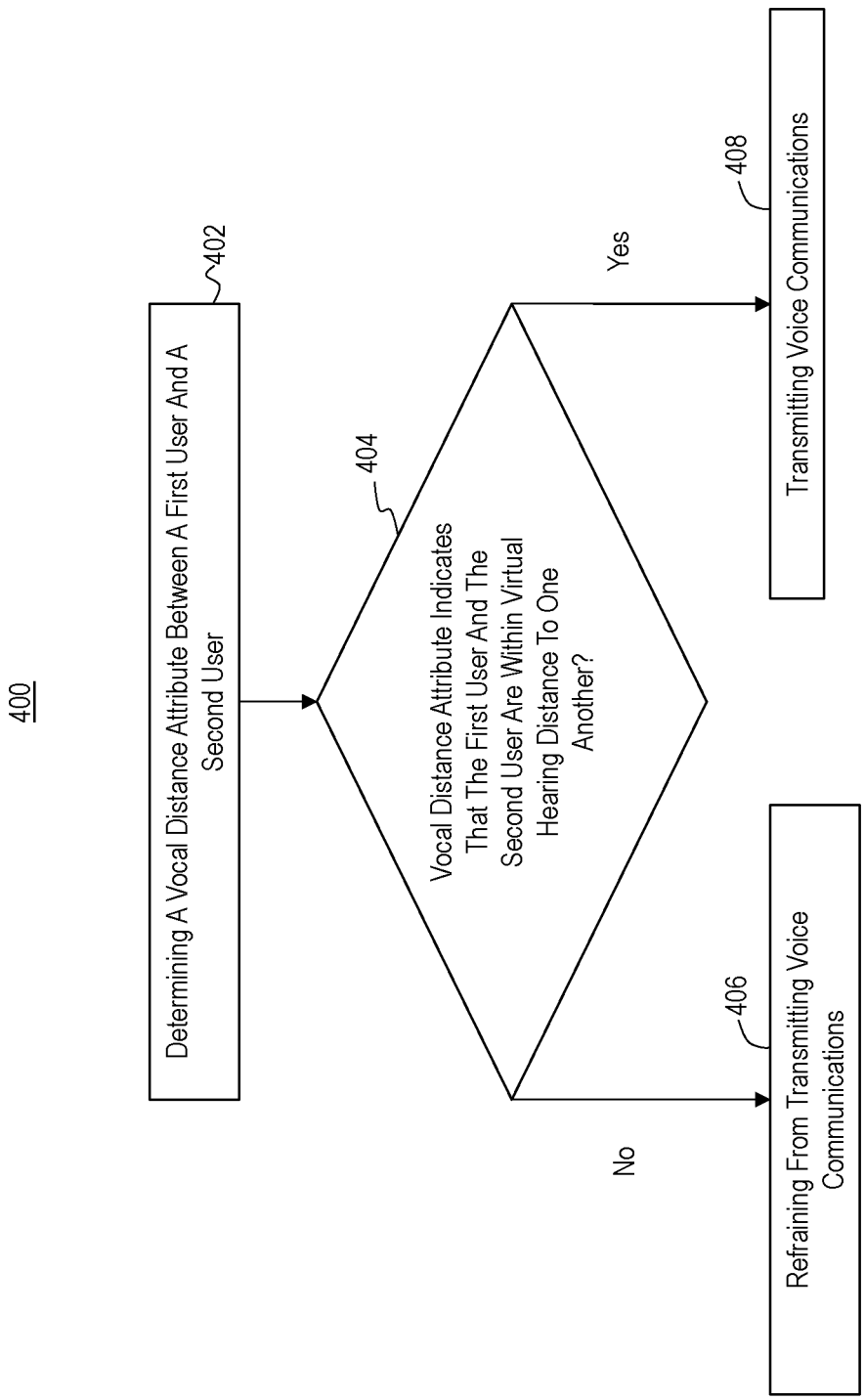
FIG. 4 illustrates another example flow diagram depicting various acts associated with determining a communication state for electronic communication devices, in accordance with implementations of the present disclosure.
Figure 5:
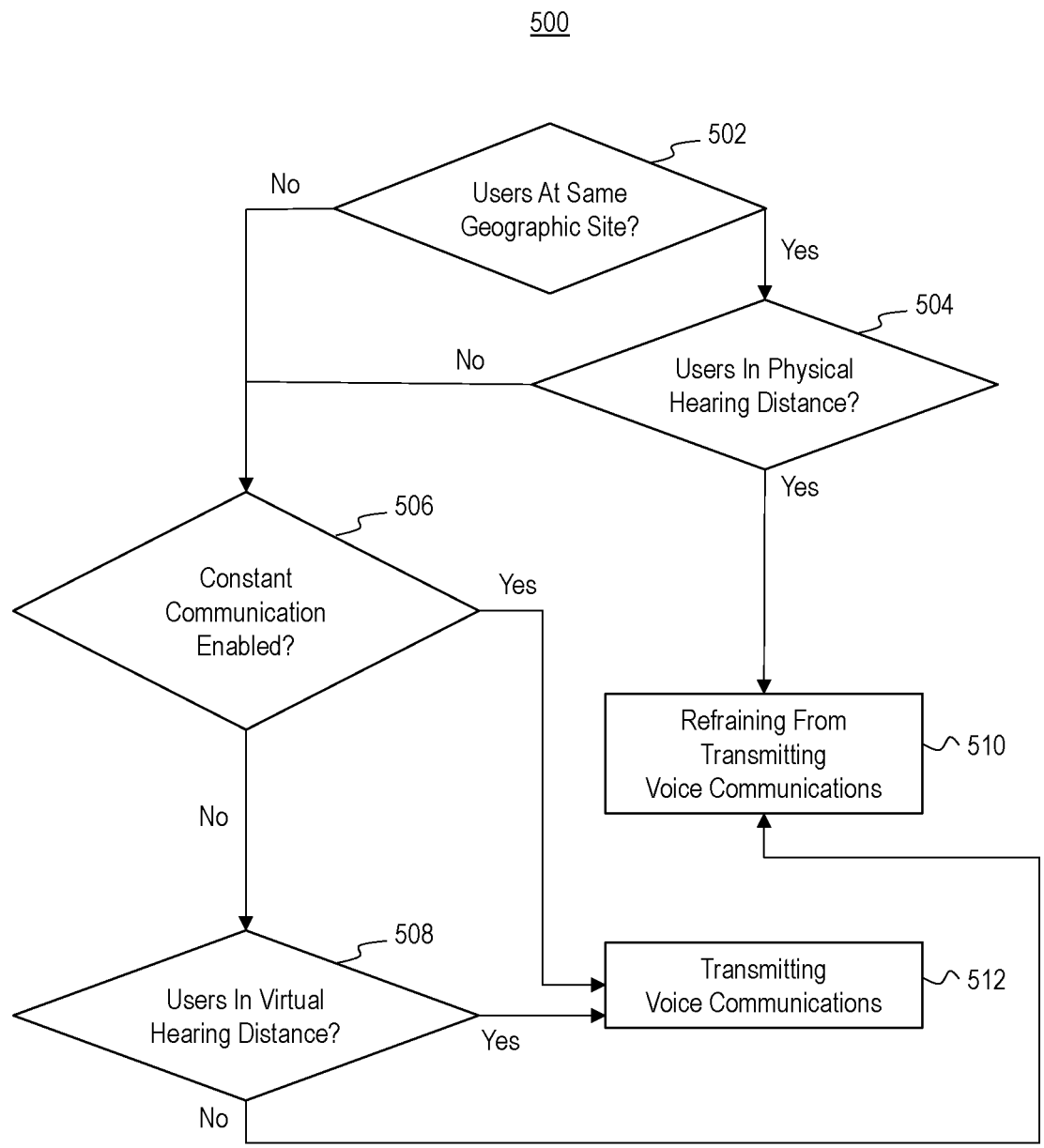
FIG. 5 illustrates yet another example flow diagram depicting various acts associated with determining a communication state for electronic communication devices, in accordance with implementations of the present disclosure.

Some implementations of the present disclosure can also be described in terms of acts (e.g., acts of a method) for accomplishing a particular result. Along these lines, FIGS. 3-5 illustrate example flow diagrams depicting various acts associated with determining a communication state for electronic communication devices. Although the acts shown in the flow diagrams may be illustrated and/or discussed in a certain order, no particular ordering is required unless specifically stated, or required because an act is dependent on another act being completed prior to the act being performed. Furthermore, it should be noted that not all acts represented in the flow diagrams are essential for determining a communication state for electronic communication devices according to the present disclosure.

In some instances, the acts of the flow diagrams are described below with reference to the systems, components, structures, and/or elements of FIGS. 1-2C. For instance, at least some reference numerals included parenthetically hereinbelow refer, by way of illustrative example, to systems, components, structures, and/or elements described hereinabove with reference to FIGS. 1-2C.

Flow diagram 300 of FIG. 3 illustrates act 302, which includes determining a vocal distance attribute (260, 265, 270) between a first user (225, 230, 220) and a second user (225, 230, 220). A communication state (280, 285, 290) for an electronic communication device 160 (e.g., whether to transmit voice communications or not) may be based on the vocal distance attribute (260, 265, 270).

In some instances, determining a vocal distance attribute (260, 265, 270) may include determining whether a first physical location (223, 227, 233) of a first user (220, 225, 230) is within a same geographic site (205, 210) as a second physical location of a second user (220, 225, 230). A vocal distance attribute (260, 265, 270) may indicate that two users (220, 225, 230) are not within physical hearing distance to one another when the physical locations (223, 227, 233) are at different geographic sites ( ).

In some instances, determining a vocal distance attribute (260, 265, 270) may include determining whether a first physical location (223, 227, 233) of a first user (220, 225, 230) is within physical hearing distance to a second physical location (223, 227, 233) of a second user (220, 225, 230). For example, determining whether a first physical location (223, 227, 233) and a second physical location (223, 227, 233) are within physical hearing distance to one another may include identifying whether the first physical location (223, 227, 233) and the second physical location (223, 227, 233) are within a same physical room (215A, 215B, 215C).

In another example, determining whether a first physical location (223, 227, 233) and a second physical location (223, 227, 233) are within physical hearing distance to one another may include identifying one or more physical objects (253, 250A, 250B) positioned between the first physical location (223, 227, 233) and the second physical location (223, 227, 233).

In yet another example, determining whether a first physical location (223, 227, 233) and a second physical location (223, 227, 233) are within physical hearing distance to one another may include identifying a first audio signal (170) detected by a first microphone (165) associated with a first electronic communication device (160) (e.g., associated with the first user (220, 225, 230)). The first audio signal may represent a verbal communication of the first user (220, 225, 230).

Determining whether the first physical location (223, 227, 233) and the second physical location (223, 227, 233) are within physical hearing distance to one another may also include determining whether a second microphone (165) associated with a second electronic communication device (160) (e.g., associated with the second user (220, 225, 230)) detects a corresponding audio signal (170) that corresponds to the first audio signal (170). For instance, the corresponding audio signal (170) may also represent the verbal communication of the first user (220, 225, 230).

Flow diagram 300 of FIG. 3 also illustrates decision block 304, which illustrates that a communication state (280, 285, 290) for an electronic communication device (160) may depend on whether the vocal distance attribute (260, 265, 270) indicates that the first user (225, 230, 220) and the second user (225, 230, 220) are within physical hearing distance of one another.

For example, act 306 of flow diagram 300 includes transmitting voice communications, which may occur in response to determining that the vocal distance attribute (260, 265, 270) indicates that the first user (225, 230, 220) and the second user (225, 230, 220) are not within physical hearing distance to one another. In such instances, a communication state (280, 285, 290), based on the vocal distance attribute, may cause voice communications to be transmitted between electronic communication devices (160) associated with the first user (220, 225, 230) and the second user (220, 225, 230).

In another example, act 308 of flow diagram 300 includes refraining from transmitting voice communications, which may occur in response to determining that the vocal distance attribute (260, 265, 270) indicates that the first user (225, 230, 220) and the second user (225, 230, 220) are within physical hearing distance to one another. In such instances, a communication state (280, 285, 290), based on the vocal distance attribute, may refrain from transmitting voice communications between electronic communication devices (160) associated with the first user (220, 225, 230) and the second user (220, 225, 230).

Flow diagram 400 of FIG. 4 illustrates act 402, which includes determining a vocal distance attribute (260, 265, 270) between a first user (225', 230', 220') and a second user (225', 230', 220') (e.g., similar to act 302 of flow diagram 300). A communication state (280, 285, 290) for an electronic communication device (160) (e.g., whether to transmit voice communications or not) may be based on the vocal distance attribute (260, 265, 270).

In some instances, determining a vocal distance attribute (260, 265, 270) may include determining whether a first virtual location (223', 227', 233') of a first user (220', 225', 230') is within virtual hearing distance to a second virtual location (223', 227', 233') of a second user (220', 225', 230'). For example, determining whether a first virtual location (223', 227', 233') and a second virtual location (223', 227', 233') are within virtual hearing distance to one another may include identifying whether the first virtual location (223', 227', 233') and the second virtual location (223', 227', 233') are within a same virtual room (215A', 215B', 215C').

In another example, determining whether a first virtual location (223', 227', 233') and a second virtual location (223', 227', 233') are within virtual hearing distance to one another may include identifying one or more virtual objects (250A', 250B', 273', 277') positioned between the first virtual location (223', 227', 233') and the second virtual location (223', 227', 233').

Flow diagram 400 of FIG. 4 also illustrates decision block 404, which illustrates that a communication state (280, 285, 290) for an electronic communication device (160) may depend on whether the vocal distance attribute (260, 265, 270) indicates that the first user (225', 230', 220') and the second user (225', 230', 220') are within virtual hearing distance of one another.

For example, act 406 of flow diagram 400 includes refraining from transmitting voice communications, which may occur in response to determining that the vocal distance attribute (260, 265, 270) indicates that the first user (225', 230', 220') and the second user (225', 230', 220') are not within virtual hearing distance to one another. In such instances, a communication state (280, 285, 290), based on the vocal distance attribute, may refrain from transmitting voice communications between electronic communication devices (160) associated with the first user (220', 225', 230') and the second user (220', 225', 230').

In another example, act 408 of flow diagram 400 includes transmitting voice communications, which may occur in response to determining that the vocal distance attribute (260, 265, 270) indicates that the first user (225', 230', 220') and the second user (225', 230', 220') are within virtual hearing distance to one another. In such instances, a communication state (280, 285, 290), based on the vocal distance attribute, may cause voice communications to be transmitted between electronic communication devices (160) associated with the first user (220', 225', 230') and the second user (220', 225', 230').

FIG. 5 illustrates a flow diagram 500 that depicts various determinations that may be included in determining a vocal distance attribute (260, 265, 270). A communication state (280, 285, 290) for an electronic communication device (160) (e.g., whether to transmit voice communications or not) may be based on the vocal distance attribute (260, 265, 270).

Flow diagram 500 of FIG. 5 illustrates decision block 502, which illustrates that a communication state (280, 285, 290) for an electronic communication device (160) may depend on whether the vocal distance attribute (260, 265, 270) indicates that two users (225, 230, 220) are at the same geographic site.

Flow diagram 500 of FIG. 5 also illustrates decision block 504, which illustrates that a communication state (280, 285, 290) for an electronic communication device (160) may depend on whether the vocal distance attribute (260, 265, 270) indicates that two users (225, 230, 220) are within physical hearing distance to one another. In some instances, decision block 504 may occur in response to determining that the two users are at the same geographic site (e.g., per decision block 502).

Flow diagram 500 of FIG. 5 also illustrates act 510, which includes refraining from transmitting voice communications. For example, a communication state (280, 285, 290) may refrain from transmitting voice communications between electronic communication devices (160) associated with two users (220, 225, 230). In some instances, act 510 may occur in response to determining that two users are at the same geographic site (205, 210) (e.g., per decision block 502), and/or in response to determining that two users (220, 225, 230) are within physical hearing distance to one another (e.g., per decision block 504).

Flow diagram 500 of FIG. 5 illustrates decision block 506, which illustrates that a communication state (280, 285, 290) for an electronic communication device (160) may depend on whether the vocal distance attribute (260, 265, 270) indicates that a constant communication setting is enabled for the two users (225, 230, 220). In some instances, decision block 506 may occur in response to determining that the two users are not at the same geographic site (e.g., per decision block 502) and/or in response to determining that the two users are not within physical hearing distance to one another (e.g., per decision block 504).

A constant communication setting may be desirable, for example, when users wish to be able to constantly communicate (e.g., whether by electronic voice communication or by physical voice communication) with one another while jointly participating in an MR experience.

Flow diagram 500 of FIG. 5 illustrates act 512, which includes transmitting voice communications. For example, a communication state (280, 285, 290) may cause voice communications to be transmitted between electronic communication devices (160) associated with two users (220, 225, 230). In some instances, act 512 may occur in response to determining that a constant communication setting is enabled (e.g., per decision block 506).

Flow diagram 500 of FIG. 5 also illustrates decision block 508, which illustrates that a communication state (280, 285, 290) for an electronic communication device (160) may depend on whether the vocal distance attribute (260, 265, 270) indicates that two users (225', 230', 220') are within virtual hearing distance to one another. In some instances, decision block 508 may occur in response to determining that the two users are not at the same geographic site (e.g., per decision block 502), in response to determining that the two users are not within physical hearing distance to one another (e.g., per decision block 504), and/or in response to determining that a constant communication setting is disabled (e.g., per decision block 506).

Flow diagram 500 also illustrates that act 512, which includes transmitting voice communications, may occur in response to determining that two users (220', 225', 230') are in virtual hearing distance to one another (e.g., per decision block 508). Furthermore, flow diagram 500 illustrates that act 510, which includes refraining from transmitting voice communications, may occur in response to determining that two users (220', 225', 230') are not in virtual hearing distance to one another (e.g., per decision block 508).

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system.

Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media (e.g., hardware storage devices) and transmission computer-readable media.

Physical computer-readable storage media includes hardware storage devices such as RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The foregoing description and Figures illustrate features, properties, details, implementations, and variations of providing voice communication within a mixed-reality environment. One will appreciate, in view of the present disclosure, that various embodiments for providing voice communication within a mixed-reality environment can include any combination of the various features, properties, details, etc. described hereinabove.

In a first embodiment, a computer system 100 for facilitating voice communication within a mixed-reality environment includes one or more processors 110 and one or more hardware storage devices 130 storing executable instructions that are operable, when executed by the one or more processors 110, to configure the computer system 100 to perform various acts.

The acts include identifying a first location 223, 227, 233, 223', 227', 233' of a first user 220, 225, 230, 220', 225', 230' within a mixed-reality environment 200'. The first user 220, 225, 230, 220', 225', 230' is associated with a first electronic communication device 160, which is capable of facilitating voice communication between one or more users 220, 225, 230, 220', 225', 230' within the mixed-reality environment 200'.

The acts also include identifying a second location 223, 227, 233, 223', 227', 233' of a second user 220, 225, 230, 220', 225', 230' within the mixed-reality environment. The second user 220, 225, 230, 220', 225', 230' is associated with a second electronic communication device 160, which is capable of facilitating voice communication between one or more users 220, 225, 230, 220', 225', 230' within the mixed-reality environment 200'.

The acts also include determining a vocal distance attribute 260, 265, 270 between the first user 220, 225, 230, 220', 225', 230' and the second user 220, 225, 230, 220', 225', 230'. The acts also include determining, based upon the vocal distance attribute 260, 265, 270, a communication state 280, 285, 290 for the first electronic communication device 160 and the second electronic communication device 160.

In a second embodiment, a computer system corresponds to the computer system of the first embodiment, and the first location of the first user comprises a first physical location of the first user, and the second location of the second user comprises a second physical location of the second user.

In a third embodiment, a computer system corresponds to the computer system of the second embodiment, and determining the vocal distance attribute comprises determining whether the first physical location and the second physical location are within a same physical geographic site. Furthermore, determining the vocal distance attribute comprises, in response to determining that the first physical location and the second physical location are not within the same geographic site, determining whether the first physical location and the second physical location are within physical hearing distance to one another.

In a fourth embodiment, a computer system corresponds to the computer system of the second or third embodiment, and determining the vocal distance attribute comprises determining whether the first physical location and the second physical location are within physical hearing distance to one another.

Furthermore, in response to determining that the vocal distance attribute indicates that the first physical location and the second physical location are within physical hearing distance to one another, the communication state causes the computer system to refrain from transmitting voice communication between the first user and the second user, or refrain from causing voice communication between the first user and the second user to be presented at the first electronic communication device or the second electronic communication device.

In a fifth embodiment, a computer system corresponds to the computer system of the fourth embodiment, and, in response to determining that the vocal distance attribute indicates that the first physical location and the second physical location are not within physical hearing distance to one another, the communication state causes the computer system to transmit voice communication between the first user and the second user.

In a sixth embodiment, a computer system corresponds to the computer system of the fourth or fifth embodiment, and determining whether the first physical location and the second physical location are within physical hearing distance to one another comprises identifying whether the first physical location and the second physical location are within a same physical room.

In a seventh embodiment, a computer system corresponds to the computer system of the fourth, fifth, or sixth embodiment, and determining whether the first physical location and the second physical location are within physical hearing distance to one another comprises identifying one or more physical objects positioned between the first physical location and the second physical location.

In an eighth embodiment, a computer system corresponds to the computer system of the fourth, fifth, sixth, or seventh embodiment, and determining whether the first physical location and the second physical location are within physical hearing distance to one another comprises identifying a first audio signal detected by a first microphone associated with the first electronic communication device, the first audio signal representing a verbal communication of the first user.

Determining whether the first physical location and the second physical location are within physical hearing distance to one another also includes determining whether a second microphone associated with the second electronic communication device detects a corresponding audio signal that corresponds to the first audio signal, the corresponding audio signal representing the verbal communication of the first user.

In a ninth embodiment, a computer system corresponds to the computer system of the fourth, fifth, sixth, seventh, or eighth embodiment, and determining the vocal distance attribute comprises, in response to determining that the first physical location and the second physical location are not within physical hearing distance to one another, determining whether a constant communication setting is enabled.

In response to determining that the vocal distance attribute indicates that the first physical location and the second physical location are not within physical hearing distance to one another and that the constant communication setting is enabled, the communication state causes the computer system to transmit voice communication between the first user and the second user.

In a tenth embodiment, a computer system corresponds to the computer system of the ninth embodiment, and determining the vocal distance attribute comprises, in response to determining that the first physical location and the second physical location are not within physical hearing distance to one another and that the constant communication setting is disabled, determining whether a first virtual location associated with the first location of the first user is within virtual hearing distance to a second virtual location associated with the second location of the second user.

In response to determining that the vocal distance attribute indicates that the first virtual location and the second virtual location are not within virtual hearing distance to one another, the communication state causes the computer system to refrain from transmitting voice communication between the first user and the second user, or refrain from causing voice communication between the first user and the second user to be presented at the first electronic communication device or the second electronic communication device.

Furthermore, in response to determining that the vocal distance attribute indicates that the first virtual location and the second virtual location are within virtual hearing distance to one another, the communication state causes the computer system to transmit voice communication between the first user and the second user.

In an eleventh embodiment, a computer system corresponds to the computer system of the first, second, third, fourth, fifth, sixth, seventh, eighth, ninth, or tenth embodiment, and the first location of the first user comprises a first virtual location of the first user, and the second location of the second user comprises a second virtual location of the second user.

In a twelfth embodiment, a computer system corresponds to the computer system of the eleventh embodiment, and determining the vocal distance attribute comprises determining whether the first virtual location and the second virtual location are within virtual hearing distance to one another.

In response to determining that the vocal distance attribute indicates that the first virtual location and the second virtual location are not within virtual hearing distance to one another, the communication state causes the computer system to refrain from transmitting voice communication between the first user and the second user, or refrain from causing voice communication between the first user and the second user to be presented at the first electronic communication device or the second electronic communication device.

Furthermore, in response to determining that the vocal distance attribute indicates that the first virtual location and the second virtual location are within virtual hearing distance to one another, the communication state causes the computer system to transmit voice communication between the first user and the second user.

In a thirteenth embodiment, a computer system corresponds to the computer system of the twelfth embodiment, and determining whether the first virtual location and the second virtual location are within virtual hearing distance to one another comprises identifying one or more virtual objects positioned between the first virtual location and the second virtual location.

In a fourteenth embodiment, a computer system corresponds to the computer system of the twelfth or thirteenth embodiment, and determining whether the first virtual location and the second virtual location are within virtual hearing distance to one another comprises identifying whether the first virtual location and the second virtual location are within a same virtual room.

In a fifteenth embodiment, a method for facilitating voice communication within a mixed-reality environment includes identifying a first location 223, 227, 233, 223', 227', 233' of a first user 220, 225, 230, 220', 225', 230' within a mixed-reality environment 200'. The first user 220, 225, 230, 220', 225', 230' is associated with a first electronic communication device 160, which is capable of facilitating voice communication between one or more users 220, 225, 230, 220', 225', 230' within the mixed-reality environment 200'.

The method also includes identifying a second location 223, 227, 233, 223', 227', 233' of a second user 220, 225, 230, 220', 225', 230' within the mixed-reality environment. The second user 220, 225, 230, 220', 225', 230' is associated with a second electronic communication device 160, which is capable of facilitating voice communication between one or more users 220, 225, 230, 220', 225', 230' within the mixed-reality environment 200'.

The method also includes determining a vocal distance attribute 260, 265, 270 between the first user 220, 225, 230, 220', 225', 230' and the second user 220, 225, 230, 220', 225', 230'. The method also includes determining, based upon the vocal distance attribute 260, 265, 270, a communication state 280, 285, 290 for the first electronic communication device 160 and the second electronic communication device 160.

In a sixteenth embodiment, a method corresponds to the method of the fifteenth embodiment, and the first location of the first user comprises a first physical location of the first user, and the second location of the second user comprises a second physical location of the second user.

In a seventeenth embodiment, a method corresponds to the method of the sixteenth embodiment, and, in response to determining that the vocal distance attribute indicates that the first physical location and the second physical location are within physical hearing distance to one another, the communication state causes a computer system to refrain from transmitting voice communication between the first user and the second user, or refrain from causing voice communication between the first user and the second user to be presented at the first electronic communication device or the second electronic communication device.

In an eighteenth embodiment, a method corresponds to the method of the fifteenth embodiment, and the first location of the first user comprises a first virtual location of the first user, and the second location of the second user comprises a second virtual location of the second user.

In a nineteenth embodiment, a method corresponds to the method of the eighteenth embodiment, and, in response to determining that the vocal distance attribute indicates that the first virtual location and the second virtual location are within virtual hearing distance to one another, the communication state causes a computer system to transmit voice communication between the first user and the second user.

In a twentieth embodiment, one or more hardware storage devices 130 store executable instructions that are operable, when executed by one or more processors 110, to configure a computer system 100 to facilitate voice communication within a mixed-reality environment 200' by performing various acts.

The acts include identifying a first location 223, 227, 233, 223', 227', 233' of a first user 220, 225, 230, 220', 225', 230' within a mixed-reality environment 200'. The first user 220, 225, 230, 220', 225', 230' is associated with a first electronic communication device 160, which is capable of facilitating voice communication between one or more users 220, 225, 230, 220', 225', 230' within the mixed-reality environment 200'.

The acts also include identifying a second location 223, 227, 233, 223', 227', 233' of a second user 220, 225, 230, 220', 225', 230' within the mixed-reality environment. The second user 220, 225, 230, 220', 225', 230' is associated with a second electronic communication device 160, which is capable of facilitating voice communication between one or more users 220, 225, 230, 220', 225', 230' within the mixed-reality environment 200'.

The acts also include determining a vocal distance attribute 260, 265, 270 between the first user 220, 225, 230, 220', 225', 230' and the second user 220, 225, 230, 220', 225', 230'. The acts also include determining, based upon the vocal distance attribute 260, 265, 270, a communication state 280, 285, 290 for the first electronic communication device 160 and the second electronic communication device 160.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A computer system for facilitating voice communication with a mixed-reality environment, comprising:
   one or more processors; and
   one or more hardware storage devices storing executable instructions that are operable, when executed by the one or more processors, to configure the computer system to perform at least the following:
   identify a first location of a first user within a mixed-reality environment, wherein the first user is associated with a first electronic communication device, the first electronic communication device capable of facilitating voice communication between one or more users within the mixed-reality environment;
   identify a second location of a second user within the mixed-reality environment, wherein the second user is associated with a second electronic communication device, the second electronic communication device capable of facilitating voice communication between one or more users within the mixed-reality environment;
   determine a vocal distance attribute between the first user and the second user; and
   determine, based upon the vocal distance attribute, a communication state for the first electronic communication device and the second electronic communication device.

2. The computer system of claim 1, wherein the first location of the first user comprises a first physical location of the first user, and wherein the second location of the second user comprises a second physical location of the second user.

3. The computer system of claim 2, wherein:
   determining the vocal distance attribute comprises determining whether the first physical location and the second physical location are within a same physical geographic site; and
   determining the vocal distance attribute comprises, in response to determining that the first physical location and the second physical location are not within the same geographic site, determining whether the first physical location and the second physical location are within physical hearing distance to one another.

4. The computer system of claim 2, wherein:
   determining the vocal distance attribute comprises determining whether the first physical location and the second physical location are within physical hearing distance to one another; and
   in response to determining that the vocal distance attribute indicates that the first physical location and the second physical location are within physical hearing distance to one another, the communication state causes the computer system to:
   refrain from transmitting voice communication between the first user and the second user, or
   refrain from causing voice communication between the first user and the second user to be presented at the first electronic communication device or the second electronic communication device.

5. The computer system of claim 4, wherein, in response to determining that the vocal distance attribute indicates that the first physical location and the second physical location are not within physical hearing distance to one another, the communication state causes the computer system to transmit voice communication between the first user and the second user.

6. The computer system of claim 4, wherein determining whether the first physical location and the second physical location are within physical hearing distance to one another comprises identifying whether the first physical location and the second physical location are within a same physical room.

7. The computer system of claim 4, wherein determining whether the first physical location and the second physical location are within physical hearing distance to one another comprises identifying one or more physical objects positioned between the first physical location and the second physical location.

8. The computer system of claim 4, wherein determining whether the first physical location and the second physical location are within physical hearing distance to one another comprises:
   identifying a first audio signal detected by a first microphone associated with the first electronic communication device, the first audio signal representing a verbal communication of the first user; and
   determining whether a second microphone associated with the second electronic communication device detects a corresponding audio signal that corresponds to the first audio signal, the corresponding audio signal representing the verbal communication of the first user.

9. The computer system of claim 4, wherein:
   determining the vocal distance attribute comprises, in response to determining that the first physical location and the second physical location are not within physical hearing distance to one another, determining whether a constant communication setting is enabled; and
   in response to determining that the vocal distance attribute indicates that the first physical location and the second physical location are not within physical hearing distance to one another and that the constant communication setting is enabled, the communication state causes the computer system to transmit voice communication between the first user and the second user.

10. The computer system of claim 9, wherein:
    determining the vocal distance attribute comprises, in response to determining that the first physical location and the second physical location are not within physical hearing distance to one another and that the constant communication setting is disabled, determining whether a first virtual location associated with the first location of the first user is within virtual hearing distance to a second virtual location associated with the second location of the second user;

in response to determining that the vocal distance attribute indicates that the first virtual location and the second virtual location are not within virtual hearing distance to one another, the communication state causes the computer system to:

refrain from transmitting voice communication between the first user and the second user, or refrain from causing voice communication between the first user and the second user to be presented at the first electronic communication device or the second electronic communication device; and in response to determining that the vocal distance attribute indicates that the first virtual location and the second virtual location are within virtual hearing distance to one another, the communication state causes the computer system to transmit voice communication between the first user and the second user.

11. The computer system of claim 1, wherein the first location of the first user comprises a first virtual location of the first user, and wherein the second location of the second user comprises a second virtual location of the second user.

12. The computer system of claim 11, wherein:

determining the vocal distance attribute comprises determining whether the first virtual location and the second virtual location are within virtual hearing distance to one another;

in response to determining that the vocal distance attribute indicates that the first virtual location and the second virtual location are not within virtual hearing distance to one another, the communication state causes the computer system to:

refrain from transmitting voice communication between the first user and the second user, or refrain from causing voice communication between the first user and the second user to be presented at the first electronic communication device or the second electronic communication device; and in response to determining that the vocal distance attribute indicates that the first virtual location and the second virtual location are within virtual hearing distance to one another, the communication state causes the computer system to transmit voice communication between the first user and the second user.

13. The computer system of claim 12, wherein determining whether the first virtual location and the second virtual location are within virtual hearing distance to one another comprises identifying one or more virtual objects positioned between the first virtual location and the second virtual location.

14. The computer system of claim 12, wherein determining whether the first virtual location and the second virtual location are within virtual hearing distance to one another comprises identifying whether the first virtual location and the second virtual location are within a same virtual room.

15. A method for facilitating voice communication within a mixed-reality environment, comprising:

identifying a first location of a first user within a mixed-reality environment, wherein the first user is associated with a first electronic communication device, the first electronic communication device capable of facilitating voice communication between one or more users within the mixed-reality environment;

identifying a second location of a second user within the mixed-reality environment, wherein the second user is associated with a second electronic communication device, the second electronic communication device capable of facilitating voice communication between one or more users within the mixed-reality environment;

determining a vocal distance attribute between the first user and the second user; and determining, based upon the vocal distance attribute, a communication state for the first electronic communication device and the second electronic communication device.

16. The method of claim 15, wherein the first location of the first user comprises a first physical location of the first user, and wherein the second location of the second user comprises a second physical location of the second user.

17. The method of claim 16, wherein:

in response to determining that the vocal distance attribute indicates that the first physical location and the second physical location are within physical hearing distance to one another, the communication state causes a computer system to:

refrain from transmitting voice communication between the first user and the second user, or refrain from causing voice communication between the first user and the second user to be presented at the first electronic communication device or the second electronic communication device.

18. The method of claim 15, wherein the first location of the first user comprises a first virtual location of the first user, and wherein the second location of the second user comprises a second virtual location of the second user.

19. The method of claim 18, wherein:

in response to determining that the vocal distance attribute indicates that the first virtual location and the second virtual location are within virtual hearing distance to one another, the communication state causes a computer system to transmit voice communication between the first user and the second user.

20. One or more non-transitory hardware storage devices storing executable instructions that are operable, when executed by one or more processors, to configure a computer system to facilitate voice communication within a mixed-reality environment by performing at least the following:

identify a first location of a first user within a mixed-reality environment, wherein the first user is associated with a first electronic communication device, the first electronic communication device capable of facilitating voice communication between one or more users within the mixed-reality environment;

identify a second location of a second user within the mixed-reality environment, wherein the second user is associated with a second electronic communication device, the second electronic communication device capable of facilitating voice communication between one or more users within the mixed-reality environment;

determine a vocal distance attribute between the first user and the second user; and determine, based upon the vocal distance attribute, a communication state for the first electronic communication device and the second electronic communication device.

* * * * *